(12) United States Patent
Walker et al.

(10) Patent No.: US 6,298,331 B1
(45) Date of Patent: Oct. 2, 2001

(54) METHOD AND APPARATUS FOR SELLING AN AGING FOOD PRODUCT

(75) Inventors: Jay S. Walker, Ridgefield; Andrew S. Van Luchene, Norwalk, both of CT (US); Jonathan Otto, New York, NY (US); Daniel E. Tedesco, New Canaan, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/083,483

(22) Filed: May 22, 1998

Related U.S. Application Data

(63) Continuation-in-part of application No. 08/920,116, filed on Aug. 26, 1997, now Pat. No. 6,119,099, which is a continuation-in-part of application No. 08/822,709, filed on Mar. 21, 1997.

(51) Int. Cl.[7] ................................................ G06F 17/60
(52) U.S. Cl. .............................. 705/15; 705/1; 705/16; 705/22; 705/400
(58) Field of Search ...................... 99/483; 364/709.03; 377/13, 14, 15, 16; 705/1, 16, 20, 22, 28, 15, 400, 418; 426/113; D07/323, 402

(56) References Cited

U.S. PATENT DOCUMENTS

| | | | |
|---|---|---|---|
| Re. 25,600 | * 6/1964 | Goldwater et al. | 178/4 |
| Re. 34,915 | 4/1995 | Nichtberger et al. | 705/14 |
| 3,222,189 | * 12/1965 | Perrozzi | 426/112 |
| 3,573,747 | 4/1971 | Adams et al. | 340/172.5 |
| 4,030,632 | * 6/1977 | Harashima | 221/150 A |
| 4,108,361 | 8/1978 | Krause | 235/375 |
| 4,323,770 | 4/1982 | Dieulot et al. | 235/375 |
| 4,494,197 | 1/1985 | Troy et al. | 364/412 |
| 4,500,880 | 2/1985 | Gomersall et al. | 340/825.35 |
| 4,669,730 | 6/1987 | Small | 273/138 A |
| 4,677,553 | 6/1987 | Roberts et al. | 364/412 |
| 4,689,742 | 8/1987 | Troy et al. | 364/412 |

(List continued on next page.)

FOREIGN PATENT DOCUMENTS

| | | |
|---|---|---|
| 512413 | 11/1992 | (EP) . |
| WO 97/46961 | 12/1997 | (EP) . |
| 57-086974 A | * 5/1982 | (JP) . |
| 05-242363 | 9/1993 | (JP) . |
| 09-00730 A | * 11/1997 | (JP) . |
| WO 9735441 | 9/1997 | (WO) . |
| WO 97/50064 | 12/1997 | (WO) . |

OTHER PUBLICATIONS

"Major Appliances: Tappan unveils microwave oven featuring preporgrammed controls"; HFD, 10 Sep. 1984, p. 103.*

Louise Cook, "Consumer Watch: Clip, Snip, Save", The Associated Press, Mar. 12, 1984, Monday PM Cycle.

(List continued on next page.)

*Primary Examiner*—Edward R. Cosimano
(74) *Attorney, Agent, or Firm*—Dean P. Alderucci

(57) ABSTRACT

An automated kitchen apparatus determines a time until expiration of a food product. In one embodiment, the kitchen apparatus determines the time until expiration by receiving a start signal indicating that a food product is available to sell. Such a start signal may be generated by a timer on a warming bin that is initiated when a food product is placed in the warming bin. By measuring the elapsed time since the start signal was received, the time until expiration is determined. Based on the time until expiration, the automated kitchen apparatus sets the minimum price of that food product. Customers at a POS terminal may then purchase the aged food product for the minimum price. In one embodiment, an offer describing the food product and its minimum price is displayed on the POS terminal. In another embodiment, the customer is offered the food product for his change due, if that change due is not less than the minimum price.

56 Claims, 17 Drawing Sheets

U.S. PATENT DOCUMENTS

| | | | |
|---|---|---|---|
| 4,723,212 | 2/1988 | Mindrum et al. | 705/14 |
| 4,760,247 | 7/1988 | Keane et al. | 235/454 |
| 4,815,741 | 3/1989 | Small | 273/138 A |
| 4,825,045 | 4/1989 | Humble | 235/383 |
| 4,839,507 | 6/1989 | May | 235/381 |
| 4,854,590 | 8/1989 | Jolliff et al. | 273/138 A |
| 4,859,838 | 8/1989 | Okiharu | 235/383 |
| 4,882,473 | 11/1989 | Bergeron et al. | 235/380 |
| 4,908,761 | 3/1990 | Tai | 705/14 |
| 4,910,672 | 3/1990 | Off et al. | 364/405 |
| 4,922,522 | 5/1990 | Scanlon | 379/95 |
| 4,937,853 | 6/1990 | Brule et al. | 379/96 |
| 4,973,952 | 11/1990 | Malec et al. | 340/825.35 |
| 4,982,337 | 1/1991 | Burr | 364/479 |
| 4,993,714 | 2/1991 | Golightly | 273/138 A |
| 5,056,019 | 10/1991 | Schultz | 364/405 |
| 5,119,295 | 6/1992 | Kapur | 364/412 |
| 5,128,862 | 7/1992 | Mueller | 705/15 |
| 5,132,914 | 7/1992 | Cahlander et al. | 700/211 |
| 5,172,328 | 12/1992 | Cahlander et al. | 700/211 |
| 5,173,851 | 12/1992 | Off et al. | 705/14 |
| 5,177,342 | 1/1993 | Adams | 235/379 |
| 5,192,854 | 3/1993 | Counts | 235/375 |
| 5,201,010 | 4/1993 | Deaton et al. | 382/139 |
| 5,216,595 | 6/1993 | Protheroe | 364/412 |
| 5,223,698 | 6/1993 | Kapur | 235/375 |
| 5,231,569 | 7/1993 | Myatt et al. | 364/408 |
| 5,239,165 | 8/1993 | Novak | 235/375 |
| 5,243,515 | 9/1993 | Lee | 364/401 |
| 5,245,533 | 9/1993 | Marshall | 705/10 |
| 5,262,941 | 11/1993 | Saladin et al. | 364/408 |
| 5,274,547 | 12/1993 | Zoffel et al. | 364/408 |
| 5,283,731 | 2/1994 | Laloude et al. | 364/401 |
| 5,287,268 | 2/1994 | McCarthy | 364/405 |
| 5,297,031 | 3/1994 | Gutterman et al. | 364/408 |
| 5,302,811 | 4/1994 | Fukatsu | 235/380 |
| 5,309,355 | 5/1994 | Lockwood | 364/401 |
| 5,353,218 | 10/1994 | DeLapa et al. | 705/14 |
| 5,353,219 | 10/1994 | Mueller et al. | 705/16 |
| 5,380,991 | 1/1995 | Valencia et al. | 235/383 |
| 5,420,606 | 5/1995 | Begum | 345/156 |
| 5,459,306 | 10/1995 | Stein et al. | 235/383 |
| 5,481,094 | 1/1996 | Suda | 705/14 |
| 5,504,475 | 4/1996 | Houdou et al. | 340/825.35 |
| 5,510,979 | 4/1996 | Moderi et al. | 705/18 |
| 5,572,653 | 11/1996 | DeTemple et al. | 395/501 |
| 5,581,064 | 12/1996 | Riley et al. | 235/383 |
| 5,592,375 | 1/1997 | Salmon et al. | 705/7 |
| 5,592,376 | 1/1997 | Hodroff | 705/14 |
| 5,602,377 | 2/1997 | Beller et al. | 235/462.15 |
| 5,611,052 | 3/1997 | Dykstra et al. | 705/38 |
| 5,612,868 | 3/1997 | Off et al. | 705/14 |
| 5,615,269 | 3/1997 | Micali | 380/49 |
| 5,620,079 | 4/1997 | Molbak | 194/217 |
| 5,621,201 | 4/1997 | Langhans et al. | 235/380 |
| 5,621,640 | 4/1997 | Burke | 235/375 X |
| 5,632,010 | 5/1997 | Briechle et al. | 345/1 |
| 5,664,115 | 9/1997 | Fraser | 705/37 |
| 5,665,953 | 9/1997 | Mazzamuto et al. | 235/383 |
| 5,724,886 | 3/1998 | Ewald et al. | 99/374 |
| 6,119,099 | * 9/2000 | Walker et al. | 705/16 |

OTHER PUBLICATIONS

"Coupons Get Serious; Supermarkets Use Barcodes to Prevent Misredemptions", Chain Store Age Executive with Shopping Center Age, Oct., 1992, vol. 68; No. 10; at p. 68; ISSN: 0193-1199.

Joseph Bonnici, David P. Campbell, William B. Fredenberger, Kathryn H. Hunnicutt; "Consumer Issues in Coupon Usage; An Exploratory Analysis", Journal of Applied Business Research, Winter 1996/1997, vol. 13, No. 1 at p. 31–40; ISSN: 0892-7626.

Jim Kirk, "Digital Promotions Make Quick Point—McDonald's Testing New Technology on its Menus", Chicago Tribune, Dec. 26, 1997 at p. 1–2.

"Progressive Introduces Kitchen Display System (KDS) for Restaurants", PR Newswire, Jan. 23, 1998, Financial News Section.

Adam Blair, "JICC Coupon Guide Recommends Upgrades at Front End", Supermarket News, Feb. 9, 1998, at p. 23; ISSN: 0039-5803.

"From Our Family To Yours . . . 5 Weeks of Coupon Values for a Variable Customer", Wakefern Food Corporation, Feb. 1998.

Mark Hamstra, "'Made-for –you' maneuvers signal competitive shift in QSR category", Nations Restaurant News, Apr. 13, 1998, 3 pp.

"New Wave Marketing", Promotion Times an SCA Quarterly Newsletter, Apr. 1998.

Universal Holding Cabinet Rollout Program Brochure, H&K Dallas Inc., Winter 1998.

NCR 7453 PC–Based Point–of–Sale Solution Brochure, NCR, Winter 1998.

"POSitive Input; The McDonald's POS-3 System Newsletter from Olivetti Solutions", McDonalds's Spring/Summer Edition 1998, 8 pp.

"It's In The Bag. Introducing the Universal Holding Cabinet From Welbilt", Frymaster, 1998 brochure.

"Introducing the Digital MenuBoard", Siren Technologies, brochure.

"For the Crew & the Customer—The Best Drive–Thru & Grill Service", Olivetti, brochure.

"Avco Financial Services", National Home Furnishing Association, (homefurnish.com/NHFA/avco.htm), download date: May 29, 1997.

Products and Services: Checkout Direct, Catalina Marketing Corporation, (catalinamktg.com/prodcdir.htm), download date May 29, 1997.

"The United Computer Exchange, How It All Works", The United Computer Exchange Corporation, (uce.combowitworks.htm), download date: Jul. 23, 1997.

"Classified 2000: The Internet Classifieds", Classifieds 2000, Inc. (classifieds2000.com/cgi–cls/Display.exe?C2K+aboutus), download date: Aug. 6, 1997.

"General Trading Floor Information and Terms Provided by trading floor.com", (tradingfloor.com/info.htm), download date: Aug. 14, 1997.

"NASDAQ" What is Nasdaq? Information Sheet, (home-.axford.com/corfin/corfl.1htm), download date Aug. 15, 1997.

Kathy Prochaska–Cue, "Acquiring Credit", (ianrwww.unl.edu/IANR/PUBS/NEBFACTS/NF91–2HTM), download date: Sep. 3, 1997.

"Welcome to ONSALE: Auction Supersite", ONSALE, (onsale.com/catergory/inv/00124972.htm), download date: Sep. 8, 1997.

"About IAO", Interactive AuctionOnline, (iaoauction.com/about.htm), download date: Sep. 8,1997.

"CAPE TOWN" Reuters Ltd. Reuters, Nov. 8, 1979.

"Save the mark", The Financial Times Limited, Feb. 1, 1983.

Jan Greene "Farm Bills please assns; National Grocers Association", Capital Cities Media Inc., Dec. 23, 1985.

"POS Spectrum: a lottery looks to POS for growth", UMI, Inc.; Banking Information Source, POS News Jan. 1989.

Robert Kuttner, "Computers May Turn The World Into One Big Commodities Pit", Business Week, Sep. 11, 1989, Ecomomic Viewpoint Section at p. 17.

Michael Schrage, "An Experiment in Economic Theory: Labs Testing Real Markets", The Record, Nov. 26, 1989, Sunday, All Editions, Business Section at p. B01.

"Let's Play Cash Register Receipts Lottery", New York Times Company, Dec. 25, 1990.

Laura Del Rosso, "Marketel Says It Plans To Launch Air Fare 'Auction' In June", Travel Weekly, Apr. 29, 1991, vol. 50; No. 34 at p. 1.

"Philips Offers Customer Financing Through Citicorp; Philips Medical Systems North America, Citicorp North America Inc.", Health Industry Today, Jun., 1991, vol. 54; No. 6; ISSN 0745–4678 at p. 4.

Jeff Pelline, "Travelers Bidding on Airline Tickets SF Firm Offers Chance For Cut–rate Fares", The San Francisco Chronicle, Aug. 19, 1991, Monday Final Edition at p. A4.

Laura Del Rosso, "Ticket–bidding Firm Closes Its Doors; Marketel International; Brief Article", Travel Weekly, Mar. 12, 1992, vol. 51; No. 21; ISSN: 0041–2082 at p. 1.

Information Access Company, a Thomson Corporation Company ASAP "Coupons get serious; supermarkets use barcodes to prevent misredemptions" Copyright 1992.

"WINN/Dixie/The Salvation Army Report Contributions for War Against Hunger" PR Newswire Association, Inc., Jun. 10, 1993.

Philip Fiorini, "No Place For Penny?" "Smallest Coin Doesn't Make Cents to Some" USA Today, Jul. 29, 1994, Final Edition at p. 1A.

Alison Smith, "Survey of UK Consumer Credit and Asset Finance", Financial Times, Nov. 3, 1994 at p. VI.

Tom Andreoli, Jeff Borden, Beth Healy, Steven R. Strahler and Mark Veverka, "Cash Machines Offer A Whole Lotto Money For Withdrawal . . . ", Crain's Chicago Business, Jun. 19, 1995, News Section at p. 8.

"Spain: BBV Launches New Card", Cards International, Jun. 22, 1995 at p. 5.

Jim Knippenberg, PSSt! Will local radio empires strike back? , Copyright 1995 The Cincinnati Enquirer, Jul. 23, 1995.

"CYBER BID", Net Fun Ltd., Copyright 1996, Brochure.

Kimberly Kadley, "Pastors praying anti–arson effort will burn bias", Copyright 1996 Nashville Banner Publishing Company, The Nashville Banner.

John Gapper, "NatWest Reports Rise in Bad Debt", Financial Times, Jul. 31, 1996, London Edition 3, News: UK Section at p. 09.

Lynx Technology: Lynx To Provide Business Leasing Programme Through Schroder Leasing, M2 Presswire, Aug. 9, 1996.

Paul Taylor, "Towards a Dream Market", Financial Times (London), Sep. 4, 1996 at p. 03.

Joseph Bonnici,; David P. Campbell; William B. Fredenberger; Kathryn H. Hunnicutt, "Consumer Issues in coupon usage: An exploratory analysis" Winter 1996/1997.

Michelle Singletary, "Electronic World, Unchecked Problem? U.S. Move to Paperless Payments Raises Worries About Those Who Don't Use Banks", The Washington Post, Mar. 4, 1997, Final Edition Financial Section at p. C01.

Bertram V. Burke "Funneling Change to Useful Pursuits", The New York Times, Jun. 9, 1997. (See Page Two (2) for the Article).

"The Key To Your Identity": Falling Costs Will Allow Fingerprint Verification to be Widely Used, Reports Geoff Nairn, Financial Times (London), Jul. 15, 1997, Technology Section at p. 12.

John Kelsey, Bruce Schneier, "Conditional Purchase Order", Fourth ACM Conference on Computer Communication Security, Apr. 1997, ACM Press at p. 117–124.

Kimball Livingston, "In–Store Systems—VideOcart Redux", RT Magazine, Mar. 1998 at p. 29–30.

Promotion Times An SCA Quarterly Newsletter–First Quarter "New Wave" Marketing.

Gilbert Rehayem "Opinion: X–Press Betting" , La Fleur's Lottery World.

* cited by examiner

| FOOD PRODUCT IDENTIFIER 118 | FOOD PRODUCT DESCRIPTION 120 | RETAIL PRICE 122 |
|---|---|---|
| 123 | HAMBURGER | $0.69 |
| 124 | CHEESEBURGER | $0.79 |
| 125 | CHICKEN SANDWICH | $1.59 |
| 126 | APPLE PIE | $0.49 |

FIG. 5

| | FOOD PRODUCT IDENTIFIER 138 | FOOD PRODUCT DESCRIPTION 140 | QUANTITY 142 | MINIMUM PRICE 144 |
|---|---|---|---|---|
| 130 → | 123 | HAMBURGER | 2 | $0.40 |
| 132 → | 126 | APPLE PIE | 1 | $0.00 |
| 134 → | 125 | CHICKEN SANDWICH | 1 | $0.32 |
| 136 → | 124 | CHEESEBURGER | 1 | $0.00 |

| FOOD PRODUCT NO. 123 ("HAMBURGER") 282 ||
|---|---|
| AGE 288 | PRICE 290 |
| 0 - 15 MINS. | RETAIL PRICE |
| > 15 MINS. | SELL FOR CHANGE DUE |

| AGE 308 | MINIMUM PRICE 310 |
|---|---|
| 0 - 15 MINS. | RETAIL PRICE |
| 16 - 17 MINS. | 50% RETAIL PRICE |
| > 17 MINS. | 10% RETAIL PRICE |

| FOOD PRODUCT NO. 123 ("HAMBURGER") 322 | | |
|---|---|---|
| AGE 330 | MINIMUM PRICE 332 | MAXIMUM PRICE 334 |
| 0 - 15 MINS. | RETAIL PRICE ($0.69) | RETAIL PRICE ($0.69) |
| 16 - 18 MINS. | $0.40 | RETAIL PRICE ($0.69) |
| > 18 MINS. | $0.00 | RETAIL PRICE ($0.69) |

324 → (row 1)
326 → (row 2)
328 → (row 3)

FIG. 13

METHOD AND APPARATUS FOR SELLING AN AGING FOOD PRODUCT

CROSS REFERENCE TO CO-PENDING APPLICATIONS

The present application is a continuation-in-part application of patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, and issued as U.S. Pat. No. 6,119,099 on Sep. 12, 2000 which is a continuation-in-part of co-pending patent application Ser. No. 08/822,709, entitled SYSTEM AND METHOD FOR PERFORMING LOTTERY TICKET TRANSACTIONS UTILIZING POINT-OF-SALE TERMINALS, filed on Mar. 21, 1997, each of which are incorporated herein by reference.

The present invention is related to the following co-pending U.S. patent applications:

U.S. patent application Ser. No. 08/923,683 entitled "Conditional Purchase Offer (CPO) Management System for Packages" filed on Sep. 4, 1997 in the name of Jay S. Walker et al.; and U.S. patent application Ser. No. 09/012,163 entitled "Method and Apparatus for Automatically Vending a Combination of Products" filed on Jan. 22, 1998 in the name of Jay S. Walker et al., each assigned to the assignee of the present invention and incorporated by reference herein.

FIELD OF THE INVENTION

The present invention relates to methods and apparatus for selling aging food products.

BACKGROUND OF THE INVENTION

Many quick service restaurants will sell food products for some time after those food products have been prepared. For example, hamburgers may be available for sale up to twenty minutes after being cooked. Food products that are excessively aged become "perished" (e.g. stale or soggy). Selling such perished food products would hurt the reputation of the restaurant. Furthermore, aged food products can pose a significant health risk to consumers, which in turn would impose liability on the restaurant. Accordingly, if the food product is not sold within a certain time period after being prepared it is typically thrown away. This waste is considered a cost of doing business.

Some modern quick service restaurants have systems for reducing the waste associated with excessively aged food products. For example, some restaurants include a demand forecasting apparatus that attempts to predict future demand for various food products. Such predictions are used to determine types and quantities of food products to be prepared. Perfect predictions would allow a restaurant to eliminate significant amounts of waste since only those food products about to be ordered would be prepared. Unfortunately, applicants are unaware of any demand forecasting apparatus that is capable of making predictions with anywhere near perfect accuracy. Accordingly demand forecasting apparatus do not eliminate waste in restaurants.

Restaurants may use various processes and apparatus to keep food products fresher for longer periods of time after cooking. For example, the Welbilt UHC4TP Universal Holding Cabinet retains cooked food components, such as hamburger patties and chicken patties, and keeps those food components fresh until they are assembled into food products, such as hamburgers and chicken sandwiches. For example, hamburger patties may be cooked on a grill and then placed in the Universal Holding Cabinet, where they remain for up to a predetermined length of time. A timer measures the length of time that the patty is in the Universal Holding Cabinet. Food components are typically assembled only when there is a need for a certain food product. Such a need may arise from an actual order for the food product or from a predicted (anticipated) order generated by a demand forecasting apparatus. For example, if hamburgers are or will be needed, the hamburger patties are removed from the Universal Holding Cabinet and assembled into hamburgers.

If a food component is not removed from the Universal Holding Cabinet before the timer reaches the predetermined time, the patty is considered not sellable and is discarded. Similarly, once a food product has been assembled, there is a limited time period within which the food product may be sold. For example, an assembled hamburger may be discarded after twenty minutes. Assembled food products are maintained in a warming bin or similar warming apparatus while they await sale, as are other food products that are ready to sell yet require no assembly.

Thus, food products and food components are often discarded at considerable cost to the restaurant. The various methods and apparatus that restaurants may employ serve to somewhat reduce this significant waste. It would be advantageous to further reduce the costs associated with the inability to sell perished food products.

SUMMARY OF THE INVENTION

It is an object of the present invention to reduce the costs associated with the inability to sell all food products that are prepared in a restaurant.

In accordance with the present invention, an automated kitchen apparatus determines a time until expiration of a food product. In one embodiment, the kitchen apparatus determines the time until expiration by receiving a start signal indicating that a food product is available to sell. Such a start signal may be generated by a timer on a warming bin that is initiated when a food product is placed in the warming bin. By measuring the elapsed time since the start signal was received, the time until expiration is determined.

Based on the time until expiration, the automated kitchen apparatus sets the minimum price of that food product. Customers at a POS terminal may then purchase the aged food product for the minimum price, or in another embodiment for an amount that is greater than the minimum price. In one embodiment, an offer describing the food product and its minimum price is displayed on the POS terminal. In another embodiment, the customer is offered the food product for his change due, if that change due is not less than the minimum price.

BRIEF DESCRIPTION OF THE DRAWINGS

FIG. 5 is a schematic illustration of an inventory database of the store server of FIG. 4.

FIG. 6 is a schematic illustration of an aged inventory database of the store server of FIG. 4.

FIG. 11 is a schematic illustration of a record of an embodiment of a price adjustment database of FIG. 4.

FIG. 12 is a schematic illustration of an embodiment of a price adjustment database of FIG. 4.

FIG. 13 is a schematic illustration of a record of an embodiment of a price adjustment database of FIG. 4.

DETAILED DESCRIPTION OF THE PREFERRED EMBODIMENTS

The present invention allows a restaurant or similar entity to significantly reduce costs and thus increase profits by identifying and selling aged food products that would otherwise have been discarded. Food products are maintained in warming bins while they await being sold. If a food product in a warming bin cannot be used to satisfy an order (whether an actual or anticipated order), then a POS terminal or other device provides an offer to sell the food product for a reduced price. If the offer is accepted, the food product is sold and registered as no longer available for sale. Thus by automatically tracking aged food products, determining appropriate prices for those food products, and dynamically adjusting a database of available food products, a restaurant may further reduce the waste associated with aged food products.

Figure 1:
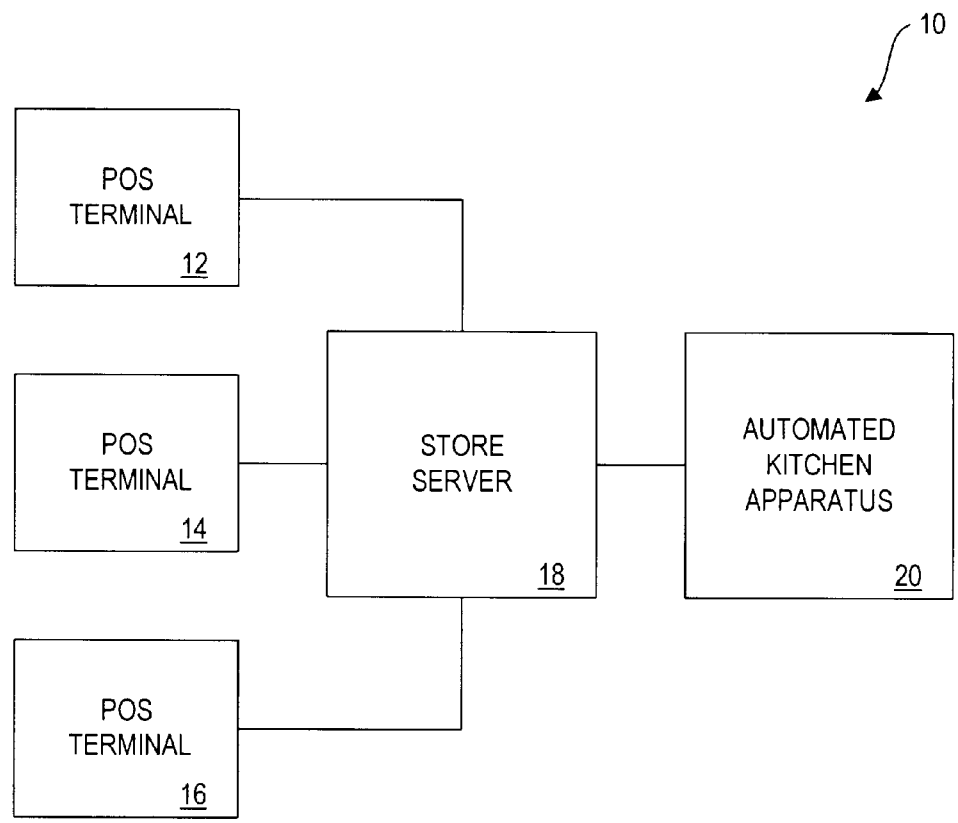
FIG. 1 is a schematic illustration of a restaurant apparatus provided in accordance with the present invention.

Referring to FIG. 1, a restaurant apparatus 10 includes point-of-sale ("POS") terminals 12, 14 and 16, each of which are in communication with a store server 18. The POS terminals 12, 14 and 16 may be, for example, the PAR Microsystems POS III or POS IV. The POS terminals 12, 14 and 16 perform such processes as calculating the total price of a purchase (goods or services) and calculating the amount of change due to a customer. The POS terminals 12, 14 and 16 may furthermore track purchases made and adjust databases of inventory accordingly. Any number of POS terminals may be included in the restaurant apparatus 10. Although three POS terminals are shown in FIG. 1, any number of POS terminals may be in communication with the store server 18 without departing from the spirit and scope of the present invention.

The store server 18 directs the operation of, stores data from and transmits data to the POS terminals 12, 14 and 16. The store server 18 may itself be a POS terminal, as described herein, or may be another computing device that can communicate with one or more POS terminals. Each of the POS terminals 12, 14 and 16 may be located in the same store, in different stores of a chain of stores, or in other locations. The store server 18 may perform many of the processes described below, especially those processes that are performed for more than one POS terminal. The store server 18 may furthermore store data, such as an inventory database, that is to be shared by the POS terminals 12, 14 and 16. Similarly, data described herein as stored on the store server 18 may be stored on the POS terminals 12, 14 and 16, as appropriate.

The store server 18 is also in communication with an automated kitchen apparatus 20. The automated kitchen apparatus 20, described in further detail below, includes components for preparing food products for sale to customers. The store server 18 receives from the automated kitchen apparatus 20 an indication of aged food products that should be sold. The store server 18 in turn communicates with the POS terminals 12, 14 and 16, where customers may be sold such aged food products.

Figure 2:
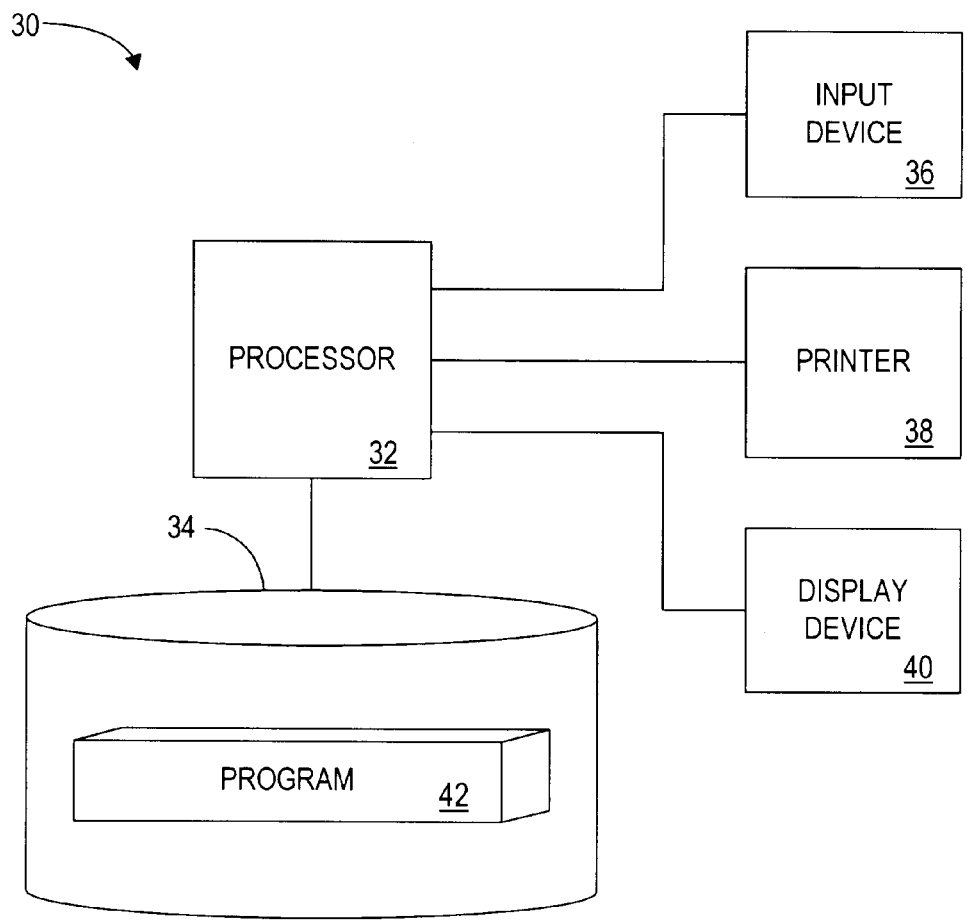
FIG. 2 is a schematic illustration of a POS terminal of the restaurant apparatus of FIG. 1.

FIG. 2 illustrates a POS terminal 30 that is descriptive of any or all of the POS terminals 12, 14 and 16 (FIG. 1). The POS terminal 30 comprises a processor 32, such as one or more conventional microprocessors. The processor 32 is in communication with a data storage device 34, such as an appropriate combination of magnetic, optical and/or semi-conductor memory. The processor 32 and the storage device 34 may each be (i) located entirely within a single computer or other computing device; (ii) connected to each other by a remote communication medium, such as a serial port cable, telephone line or radio frequency transceiver; or (iii) a combination thereof. For example, the POS terminal 30 may comprise one or more computers that are connected to a remote server computer for maintaining databases.

An input device 36 preferably comprises a keypad for transmitting input signals, such as signals indicative of a purchase, to the processor 32. The input device 36 may also comprise an optical bar code scanner for reading bar codes and transmitting signals indicative of those bar codes to the processor 32. A printer 38 is for registering indicia on paper or other material, thereby printing waste receipts, sales receipts and coupons as controlled by the processor 32. A display device 40 is preferably a video monitor for displaying at least alphanumeric characters to the customer and/or cashier. Many types of input devices, printers and display devices are known to those skilled in the art, and need not be described in detail herein. The input device 36, printer 38 and display device 40 are each in communication with the processor 12.

The storage device 34 stores a program 42 for controlling the processor 32. The processor 32 performs instructions of the program 42, and thereby operates in accordance with the present invention, and particularly in accordance with the methods described in detail herein. The program 42 furthermore includes program elements that may be necessary, such as an operating system and "device drivers" for allowing the processor 32 to interface with computer peripheral devices, such as the input device 36, the printer 38 and the display device 40. Appropriate device drivers and other necessary program elements are known to those skilled in the art, and need not be described in detail herein.

Figure 3:
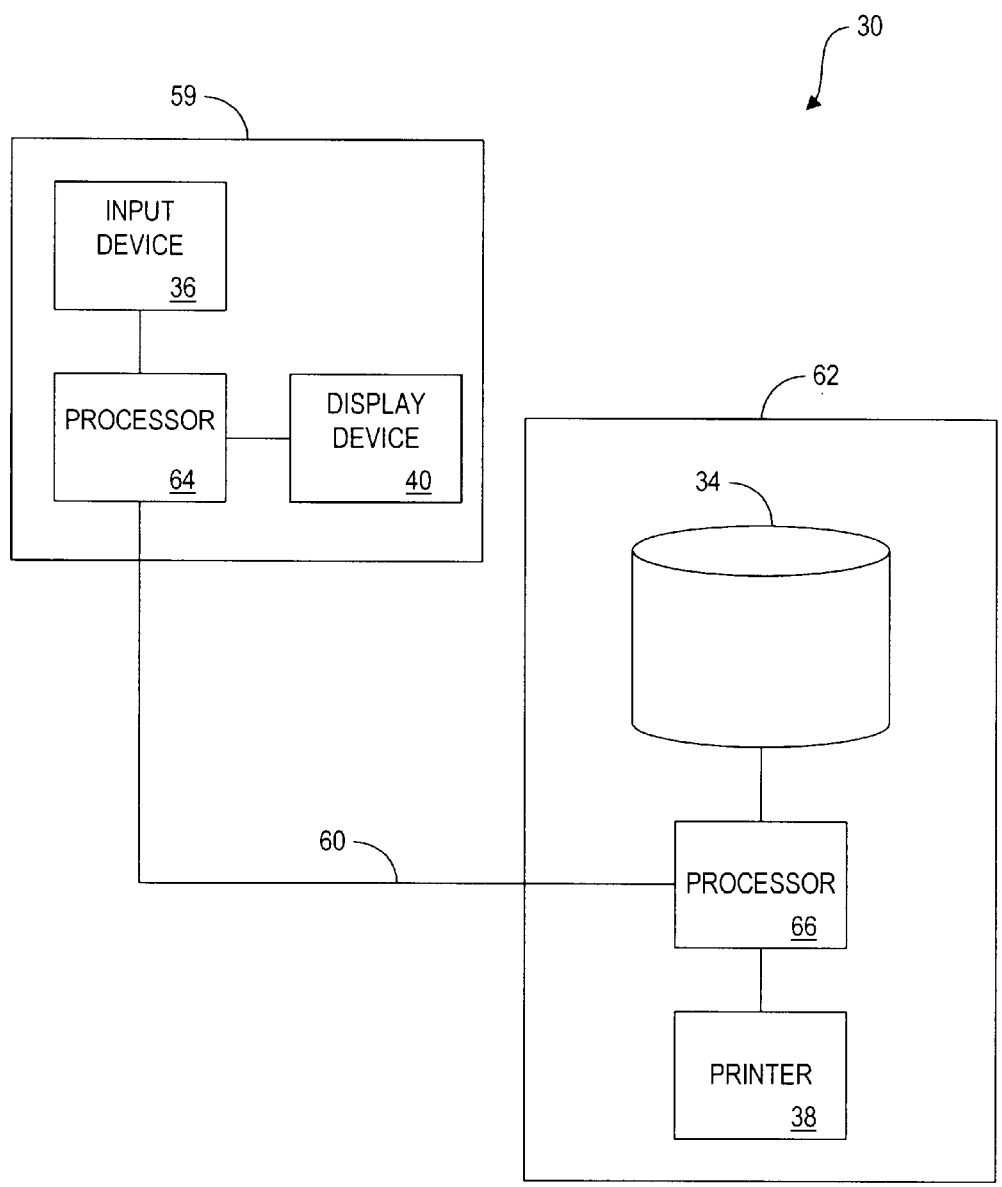
FIG. 3 is a schematic illustration of another embodiment of the POS terminal of FIG. 2.

FIG. 3 illustrates another embodiment of a POS terminal 30. in which a control device 59 is in communication via a communication medium 60 with a system 62 for providing an offer for an upsell. The control device 59 comprises a processor 64 in communication with the input device 36 and the display device 40. The system 62 for providing an offer comprises a processor 66 in communication with the storage device 34 and the printer 38. In this embodiment, the control device 59 may be a cash register, and the system 62 may be an electronic device for printing coupons in accordance with data received from the cash register. Other configurations of the POS terminal 30 will be understood by those skilled in the art.

Figure 4:
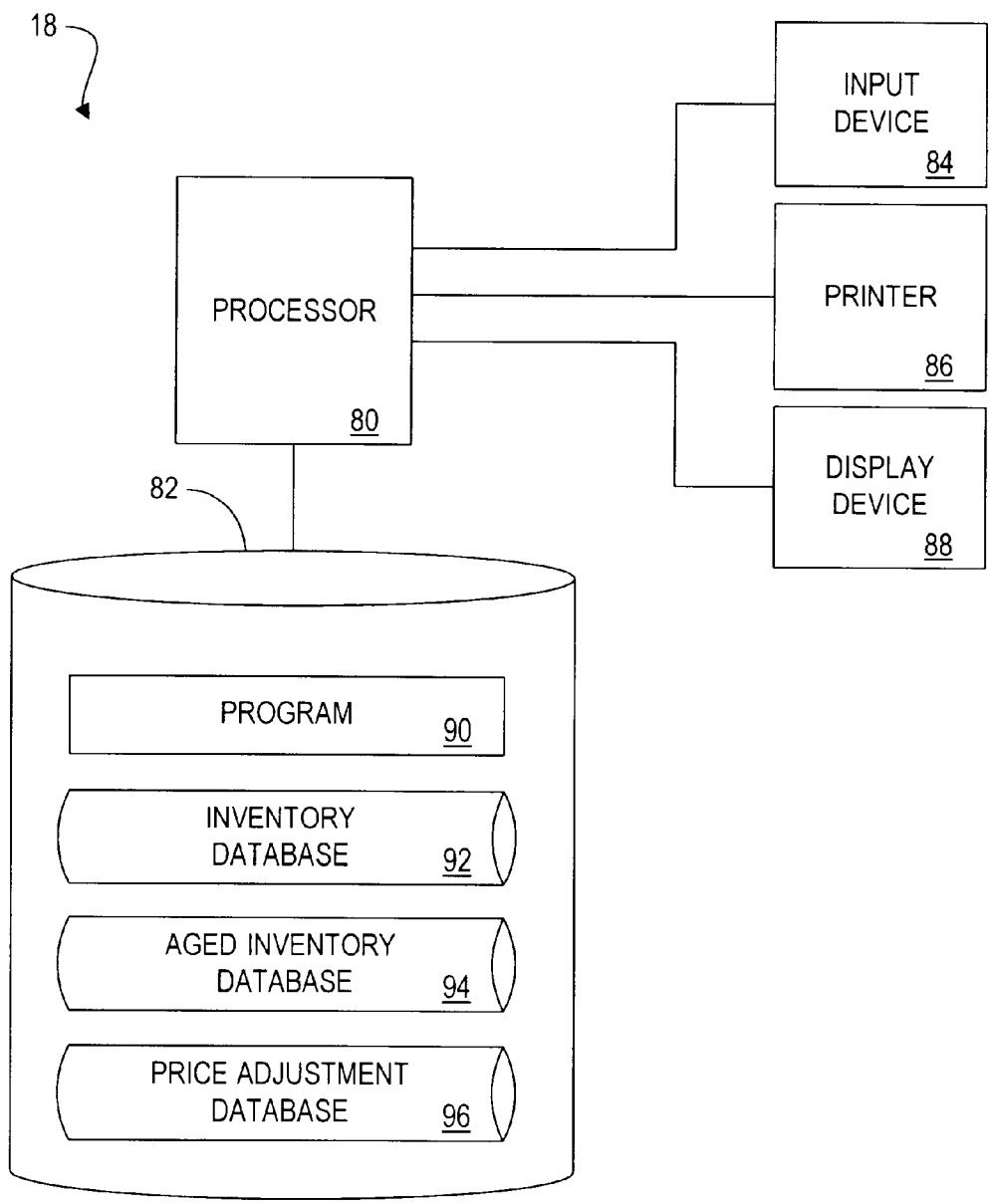
FIG. 4 is a schematic illustration of a store server of the restaurant apparatus of FIG. 1.

FIG. 4 illustrates the store server 18 (FIG. 1), which comprises a processor 80, such as one or more conventional microprocessors, such as the INTEL PENTIUM® microprocessor. The processor 80 is in communication with a data storage device 82, such as an appropriate combination of magnetic, optical and/or semiconductor memory, as is apparent to those skilled in the art. The processor 80 and the storage device 82 may each be (i) located entirely within a single computer or other computing device; (ii) connected to each other by a remote communication medium, such as a serial port cable, telephone line or radio frequency transceiver; or (iii) a combination thereof. For example the store server 18 may comprise one or more conventional computers that are connected to a remote server computer for maintaining databases.

An input device 84 preferably comprises a keypad for transmitting input signals to the processor 80. A printer 86 is for registering indicia on paper or other material, thereby printing reports and other documents as controlled by the processor 80. A display device 88 is preferably a video monitor for displaying at least alphanumeric characters. Many types of input devices, printers and display devices are known to those skilled in the art, and need not be described in detail herein. The input device 84, printer 86 and display device 88 are each in communication with the processor 80.

The storage device 82 stores a program 90 for controlling the processor 80. The processor 80 performs instructions of the program 90, and thereby operates in accordance with the present invention, and particularly in accordance with the methods described in detail herein. The program 90 furthermore includes program elements that may be necessary, such as an operating system and "device drivers" for allowing the processor 80 to interface with computer peripheral devices, such as the input device 84, the printer 86 and the display device 88. Appropriate operating systems, device drivers and other necessary program elements are known to those skilled in the art, and need not be described in detail herein.

The storage device 82 also stores (i) inventory database 92; (ii) aged inventory database 94; and (iii) price adjustment database 96. The databases 92, 94 and 96 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, and those skilled in the art will understand that the number and content of the entries can be different from those illustrated herein.

Referring to FIG. 5, the inventory database 92 includes entries 110, 112, 114 and 116, each defining a food product. Each entry includes (i) a food product identifier 118 that uniquely identifies the food product; (ii) a description 120 of the food product; and (iii) a retail price 122 of the food product. Information stored in the inventory database 92 is available to the POS terminals 12, 14 and 16 (FIG. 1), so that any POS terminal may, for example, calculate a price of a purchase that includes one or more food products that are ordered. The information stored in the inventory database 92, particularly the selection of available food products and their retail prices, is typically established by a restaurant manager or other personnel.

Referring to FIG. 6, the aged inventory database 94 includes entries 130, 132, 134 and 136, each defining a food product that has aged excessively and thus is desirable to sell at a reduced price, rather than be discarded. Each entry includes (i) a food product identifier 138 that uniquely identifies the aged food product, and that corresponds to the food product identifier 118 (FIG. 5); (ii) a description 140 of the aged food product; (iii) a quantity 142 of the aged food product that is available to sell at a reduced price; and (iv) a minimum price 144 of the aged food product. As described below, an aged food product may be sold for an amount equal to the minimum price, or in another embodiment may be sold for an amount equal to or greater than the corresponding minimum price of the food product.

Information stored in the aged inventory database 94 is available to the POS terminals 12, 14 and 16 (FIG. 1), so that any POS terminal may provide an indication of aged food products that are currently available for sale. The information stored in the aged inventory database 94 is typically established by the automated kitchen apparatus 20, as described in detail below.

Figure 7:
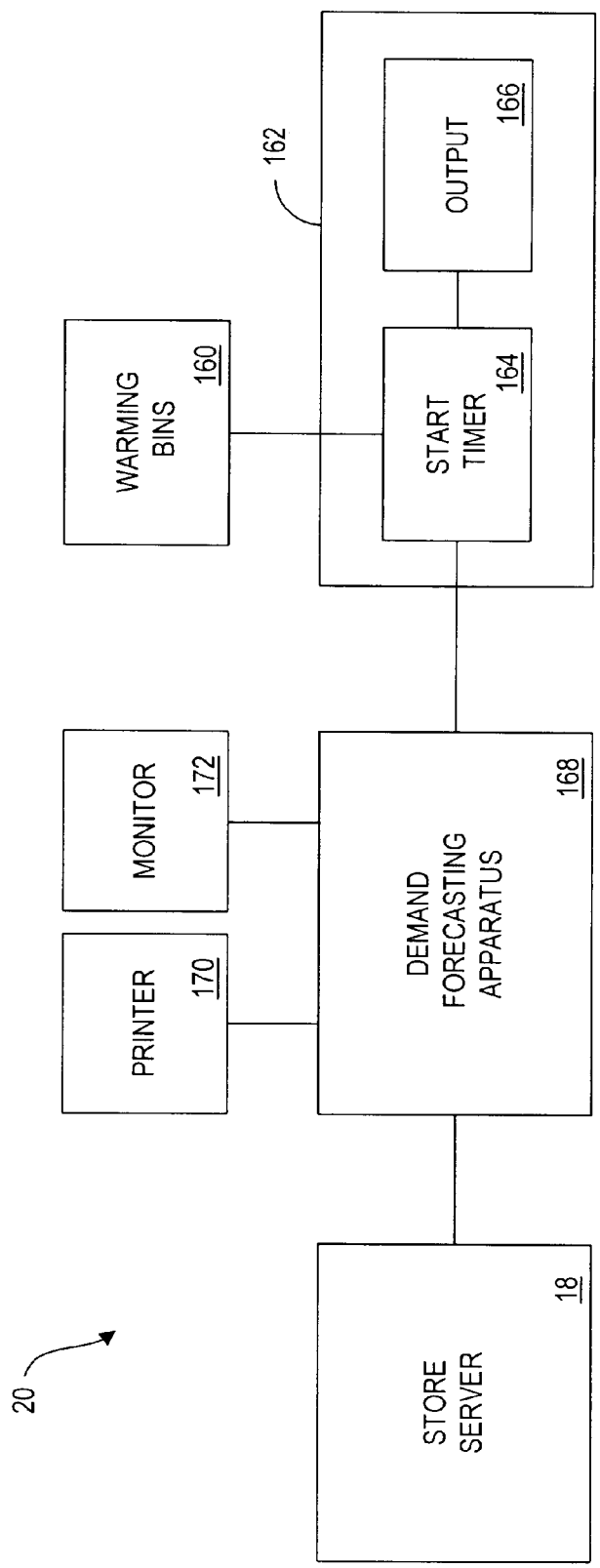
FIG. 7 is a schematic illustration of an automated kitchen apparatus of the restaurant apparatus of FIG. 1.

Referring to FIG. 7, the automated kitchen apparatus 20 includes warming bins 160 that hold cooked food products that are available for sale and keep those food products warm while they await being sold. Suitable apparatus for holding food products that are available for sale will be apparent to those skilled in the art.

The warming bins 160 are in communication with a timer 162 that is used in determining the time until expiration of each food product in the warming bins 160. The timer 162 can be any known device for measuring elapsed time or otherwise counting at predetermined intervals. The expiration of a food product is defined as the point at which the food product has "perished" (is no longer considered sellable), such as when the food product is undesirably cold, stale, melted, soggy or otherwise unsavory. Typically, the expiration is deemed to occur a predetermined length of time after a food product has been cooked and placed in the warming bins 160. Different food products will have different lengths of time until they expire (e.g. twenty minutes for hamburgers, thirty minutes for apple pies).

The timer 162 includes a "start timer" input 164 that generates and transmits a start signal for each food product. The start signal is used by the timer 162 to initiate measurement of the age of a food product. The start signal may also be transmitted to another device that counts elapsed time since receiving the start signal, and therefor determines the age of a food product. In one embodiment, the start timer input 164 automatically generates a start signal when a food product is placed in the warming bins 160. For example, the warming bins 160 may include pressure plates (not shown) or other sensors that are actuated when food products are placed thereon. The pressure plates in turn send signals to the start timer input 164. The start timer input 164, in response, generates the start signal(s) for the corresponding food product(s). In another embodiment, the start timer input 164 can comprise one or more input buttons, each corresponding to a food product. A start signal is generated when a cook or other personnel actuates a button of the start timer input 164. In such an embodiment, there would typically be a corresponding button for each of a plurality of locations in the warming bins 160 where food products may be placed. The cook may actuate the appropriate button when he places a food product in the warming bins 160.

The timer 162 may also include an output 166 that provides an indication of the time until expiration of each food product in the warming bins 160. For example, the output 166 may be a liquid crystal display (LCD) that displays alphanumeric text (e.g. minutes and seconds) for each food product in the warming bins 160. Alternatively, the output 166 may simply indicate, for each food product, an age category of the food product. For example, the output 166 may comprise a plurality of light-emitting diodes (LEDs), each corresponding to a food product and each providing constant illumination (e.g. if the food product is very fresh) or intermittent illumination (flashing) (e.g. if the food product is aged). The output 166 may further indicate the age of each food product by color (e.g. green for fresh, red for aged). The output may provide audio output (e.g. beep when the corresponding food product is aged).

The timer 162 is in communication with a demand forecasting apparatus 168 that attempts to predict future demand for various food products and issue instructions to prepare those food products if necessary. The demand forecasting apparatus 168 may be the MCDONALD'S® "Just-In-Time" software which forecasts demand and orders food products in anticipation of the forecasted demand. The demand forecasting apparatus 168 is in communication with a printer 170 for printing waste receipts and a monitor 172 for displaying information regarding predicted food products. For example, the monitor may display instructions to restaurant employees directing them to prepare various types and quantities food products.

The demand forecasting apparatus 168 receives from the timer 162 signals from which may be determined (i) the quantity and types of food products awaiting sale in the warming bins 160; and (ii) the time until expiration of each food product in the warming bins 160. Table 1 below describes several possible formats for the signals transmitted by the timer. Still further formats will be understood by those skilled in the art.

TABLE 1

Timer Signal Formats

| Format | When Transmitted | Example |
| --- | --- | --- |
| "START 1" | when placed in warming bins | Hamburger (transmitted at 4:18:38 PM)<br>Hamburger (transmitted at 4:19:24 PM) |
| "START 2" | periodically or as requested | Hamburger: started at 4:18:38 PM<br>Hamburger: started at 4:19:24 PM |
| "EXPIRES 1" | periodically or as requested | Hamburger: expires at 4:38:38 PM<br>Hamburger: expires at 4:39:24 PM |
| "EXPIRES 2" | periodically or as requested | Hamburger: expires in 0:03:38<br>Hamburger: expires in 0:04:24 |
| "AGE" | periodically or as requested | Hamburger: age is 0:16:22<br>Hamburger: age is 0:15:36 |

As indicated in Table 1, the timer 162 may periodically transmit signals (e.g. every minute) or may transmit signals as demanded (e.g. upon receiving a request from the demand forecasting apparatus 168 ).

Based on the signals received from the timer 162, the demand forecasting apparatus 168 may (i) determine which food products have expired, and (ii) command the printer 170 to generate corresponding waste receipts. Waste receipts are typically slips of paper upon which are registered indicia describing the type and quantity of food products that are to be disposed of, rather than sold. The demand forecasting apparatus 168 furthermore stores an indication of the type and quantity of food products that are to be disposed of so that inventory may be properly tracked and accounted for. The demand forecasting apparatus 168 also appropriately adjusts its instructions to prepare various types and quantities of food products in accordance with predicted demand and disposed of food products.

Figure 8:
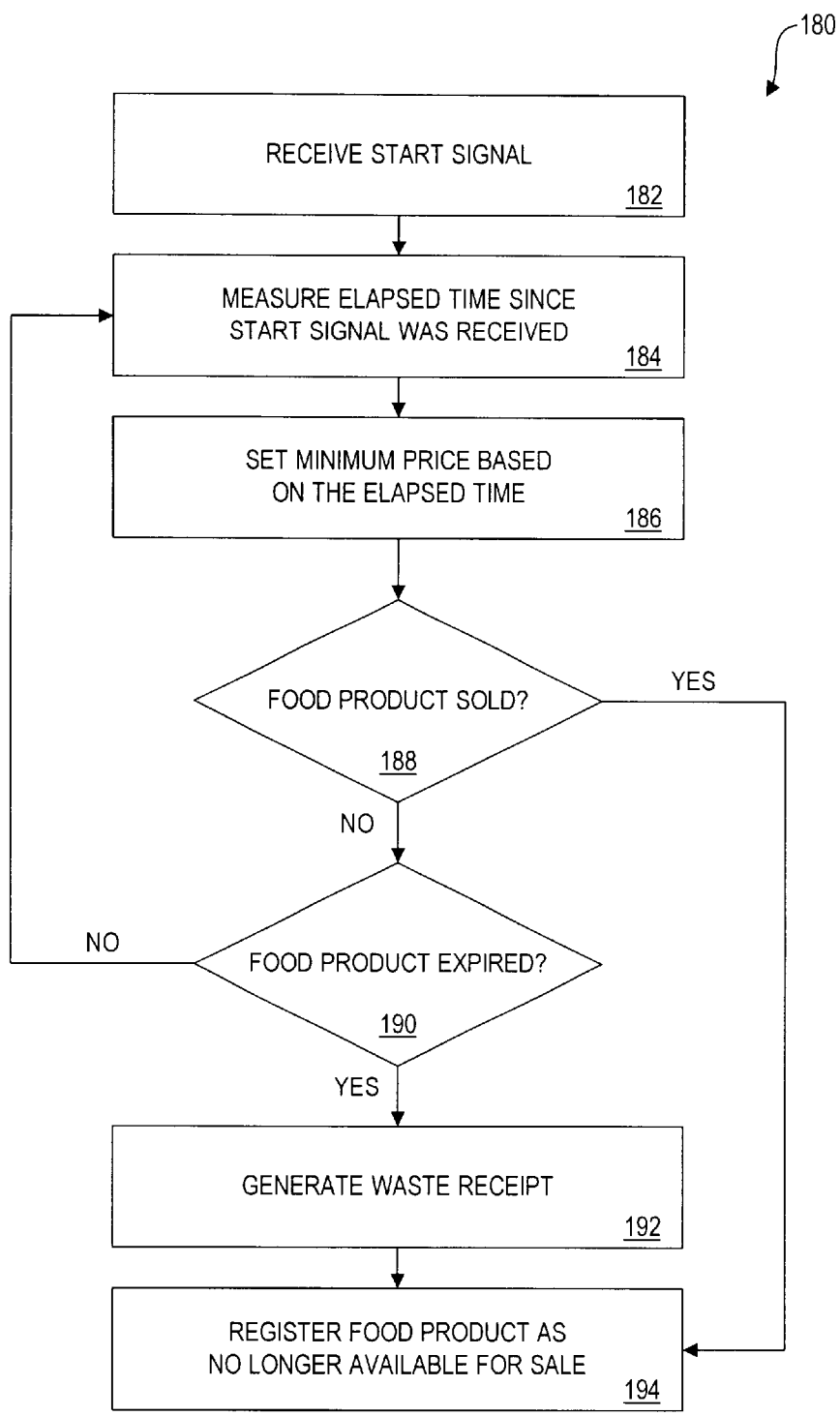
FIG. 8 is a flow chart illustrating a method for selling an aging food product provided in accordance with the present invention.

Referring to FIG. 8, a method 180 for identifying aged food products that are desirable to sell at a reduced price may be performed by the demand forecasting apparatus 168 (FIG. 7) and/or the store server 18 (FIG. 1), as appropriate. The time until expiration of each food product is first determined. One way of determining such a time is to receive the start signal for each food product from the timer 162 of FIG. 7 (step 182 ) and measure the corresponding elapsed time since the start signal was received (step 184 ). Based on the elapsed time, the time until expiration may be determined. For example, if hamburgers are deemed to expire twenty minutes after being placed in the warming bins 160 (FIG. 7), and the elapsed time is seven minutes, then the time until expiration is thirteen minutes (20−7=13). Alternative ways for determining the time until expiration will be readily understood, particularly with reference to the various possible formats described in Table 1 above.

Based on the time until expiration, a minimum price (described in further detail below) of each food product is set (step 186). If a food product is not sold (step 188), it is determined whether the food product has expired (step 190). One way of determining whether a food product has expired is to determine whether the corresponding elapsed time is less than zero, or some other predetermined threshold. If a food product has not expired, the elapsed time continues to be measured (step 184). If a food product has expired, a waste receipt is generated (step 192), and that food product is registered as no longer available for sale (step 194). Similarly, if a food product is sold (step 188), that food product is registered as no longer available for sale (step 194).

Figure 9:
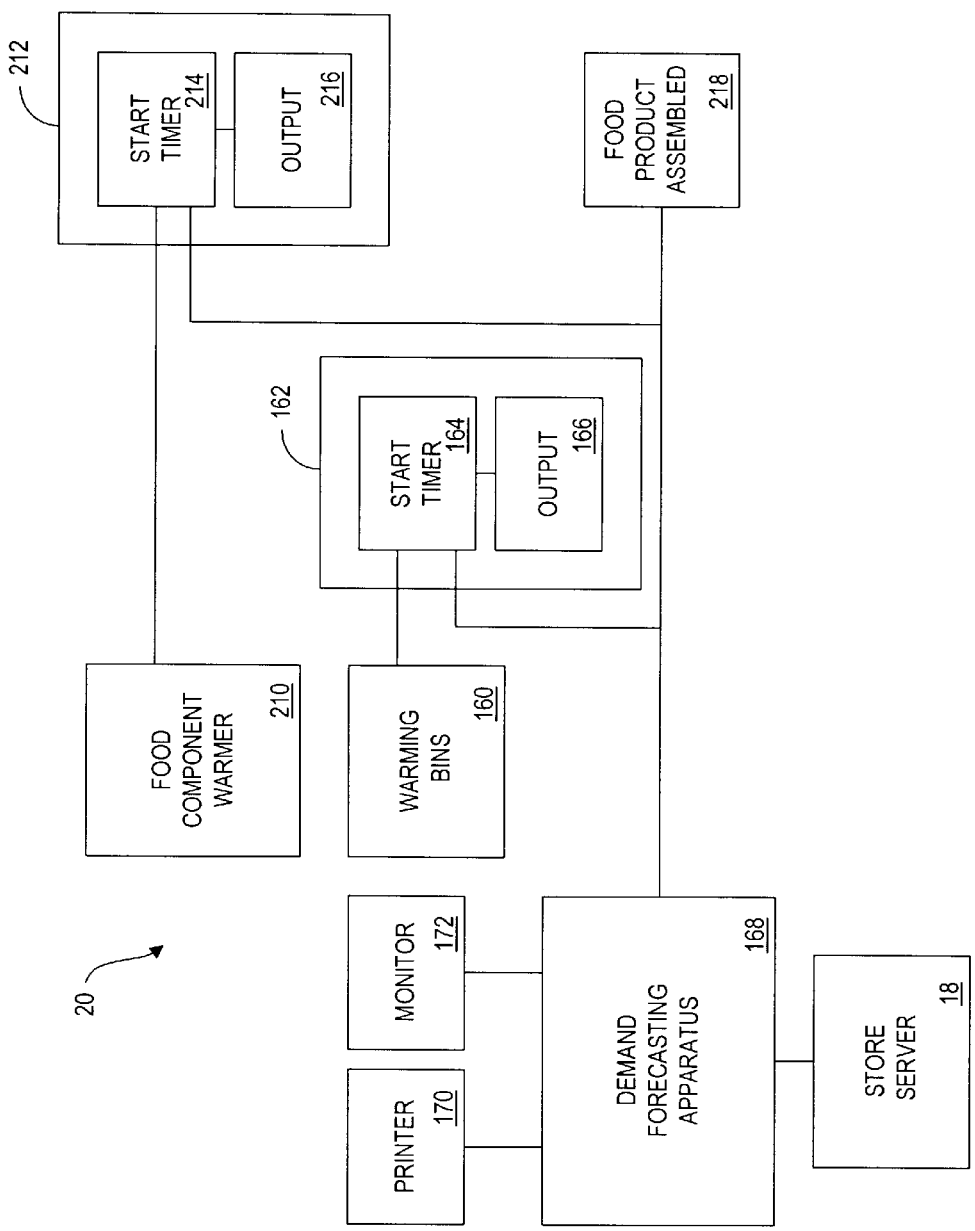
FIG. 9 is a schematic illustration of another embodiment of the automated kitchen apparatus of FIG. 7.

Referring to FIG. 9, another embodiment of the automated kitchen apparatus 20 includes the demand forecasting apparatus 168, the printer 170 and the monitor 172 described above with reference to FIG. 7. A food component warmer 210 holds cooked food components, and keeps those food components warm while they await being assembled into food products. The food component warmer 210 may be the Welbilt UHC4TP universal holding cabinet or may be a device utilizing controlled vapor technology ("CVAP"), a cooking, holding and thermalizing technology developed by Winston Industries of Louisville Ky. for maintaining food temperature and moisture content.

The food component warmer 210 is in communication with a timer 212, which is similar to the timer 62 (FIG. 7). The timer 212 is used in determining the time until each food component in the food component warmer 210 must be assembled. For example, it may be desirable to limit the time that a hamburger patty may be in the food component warmer 210 to thirty minutes. After thirty minutes, the hamburger patty must be used to assemble a hamburger, or it must be discarded since it has perished. Typically, the time until assembly is required is deemed to occur a predetermined length of time after a food component has been cooked and placed in the food component warmer 210. Different food components will have different lengths of time until they expire (e.g. thirty minutes for hamburger patties, forty minutes for chicken patties).

The timer 212 includes a "start timer" input 214 that generates and transmits a start signal for each food component. The start signal is used by the timer 212 to initiate measurement of the age of a food component. The start signal may also be transmitted to another device that counts elapsed time since receiving the start signal, and therefor determines the age of a food component. In one embodiment, the start timer input 214 automatically generates a start signal when a food component is placed in the food component warmer 210. For example, the food component warmer 210 may include pressure plates (not shown) or other sensors that are actuated when food components are placed thereon. The pressure plates in turn send signals to the start timer input 214. The start timer input 214, in response, generates the start signal(s) for the corresponding food component(s). In another embodiment, the start timer input 214 can comprise one or more input buttons, each corresponding to a food component. A start signal is generated when a cook or other personnel actuates a button of the start timer input 214. In such an embodiment, there would typically be a corresponding button for each of a plurality of locations in the food component warmer 210 where food components may be placed. The cook would actuate the appropriate button when he places a food component in the food component warmer 210.

The timer 212 also includes an output 216 that provides an indication of the time until expiration (i.e. until the food component is aged and should be assembled into a food product) of each food component in the food component warmer 210. The output 216 is similar to the output 166 (FIG. 7).

When a food component is near or at expiration, it is assembled into a food product if possible. If a cook or other restaurant personnel assembles the food component into a food product, he so indicates using a "food product assembled" input 218. The food product assembled input 218 may comprise one or more input buttons, each corresponding to a food component. Once assembled, the food product is placed in the warming bins 160, and the start timer input 164 generates and transmits a start signal, as described above with reference to FIG. 7. In one embodiment, the food product assembled input 218 is the start timer input 164. In another embodiment, the food product assembled input 218 is a separate device, as will be understood by those skilled in the art.

Figure 10A:
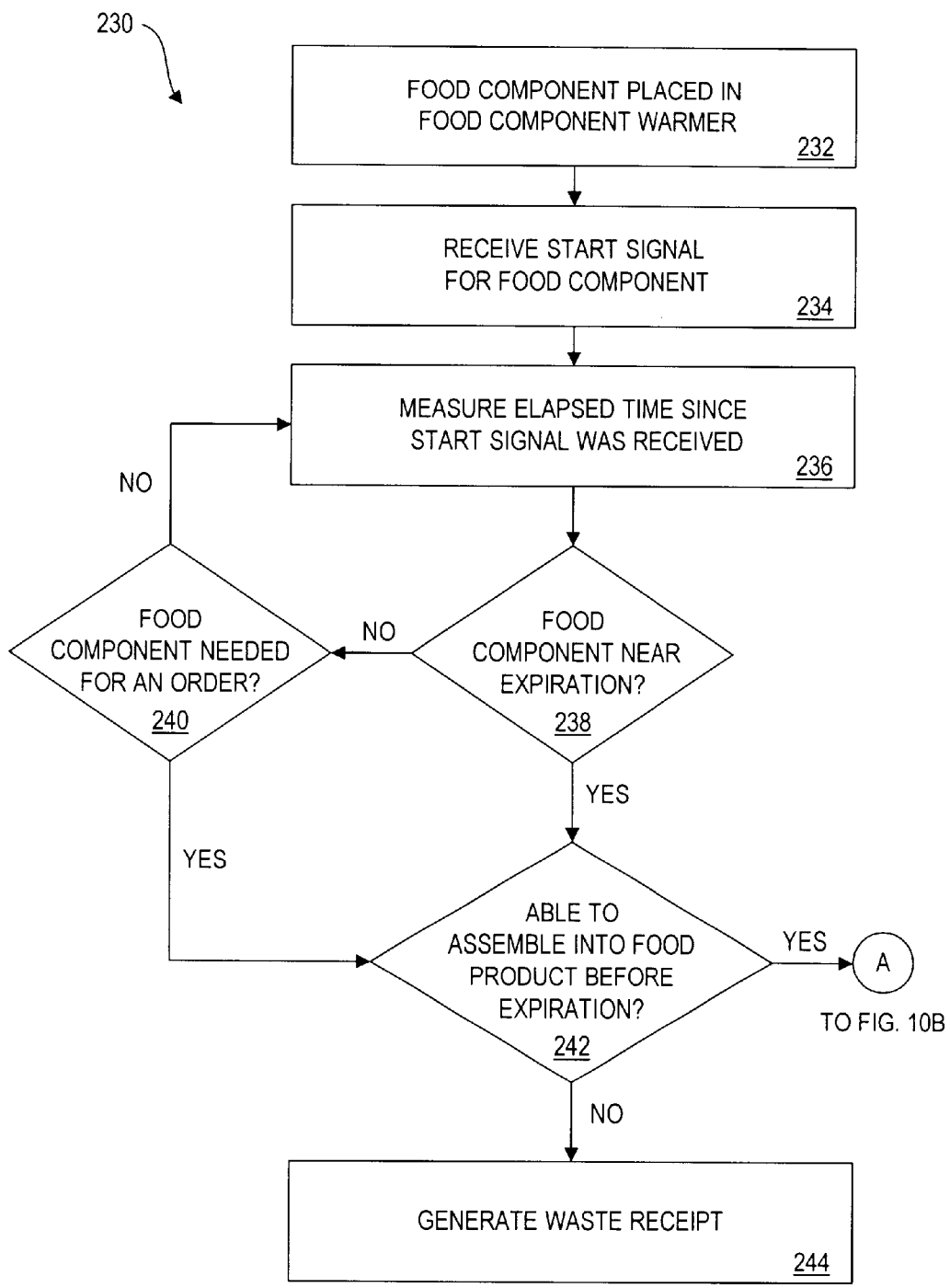
FIGS. 10A and 10B are a flow chart illustrating another embodiment of a method for selling an aging food product provided in accordance with the present invention.
Figure 10B:
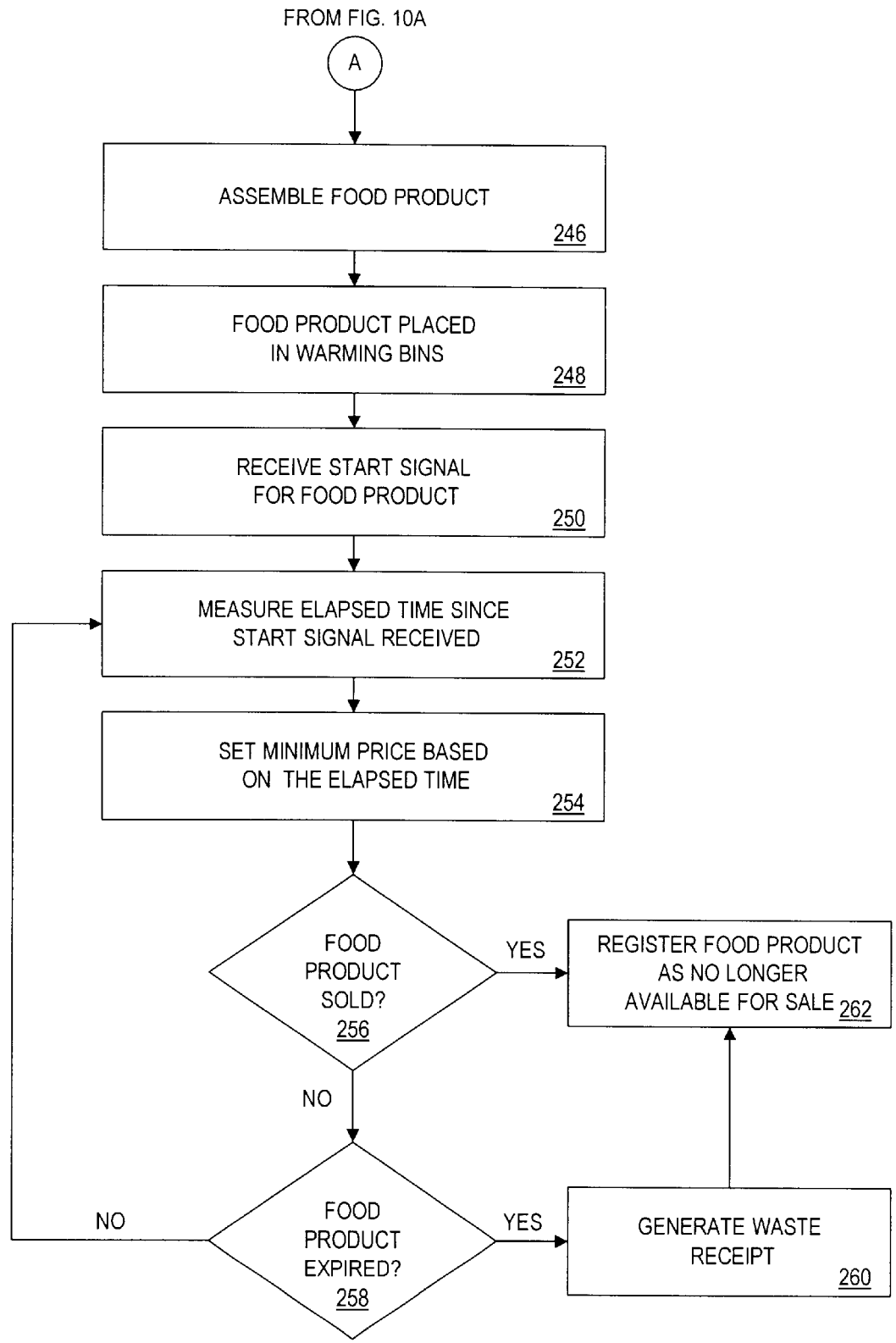

Referring to FIGS. 10A and 10B, another method 230 for identifying aged food products that are desirable to sell at a reduced price may be performed by the demand forecasting apparatus 168 (FIGS. 7 and 9) and/or the store server 18 (FIG. 1), as appropriate. At step 232, one or more food components are placed in the food component warmer 210 (FIG. 9), and the time until expiration of each food component is determined. One way of determining such a time is to receive the start signal for each food component (step 234) from the timer 212 (FIG. 9) and measure the corresponding elapsed time since the start signal was received (step 236). Based on the elapsed time, the time until expiration may be determined. For example, if hamburger patties are deemed to expire thirty minutes after being placed in the food component warmer 210 (FIG. 9), and the elapsed time is seven minutes, then the time until expiration is twenty three minutes (30−7=23). Alternative ways for determining the time until expiration will be readily understood, particularly with reference to the various possible formats described in Table 1 above.

If a food component is not near or at expiration (step 238), and if the food component is not needed to fulfill an order (step 240), then the food component remains in the food component warmer 210. Otherwise, it is assembled into a food product if possible (step 242). It may not be possible to assemble an expiring food component (e.g. restaurant personnel are too busy). Accordingly, if a food component expires, it is discarded, and a corresponding waste receipt is generated (step 244).

If a cook or other restaurant personnel is able to assemble the food component into a food product (step 246), he so indicates using a "food product assembled" input 218 (FIG. 9), the food product is placed in the warming bins 160 (step 248), and the time until expiration of the food product is determined. One way of determining such a time is to receive the start signal for the food component (step 250) from the timer 212 (FIG. 9) and measure the corresponding elapsed time since the start signal was received (step 252). Based on the elapsed time, the time until expiration may be determined. Similarly, the age of a food product is measured from the time the food product is assembled and placed in the warming bins 160.

Based on the time until expiration, a minimum price (described in further detail below) of each food product is set (step 254). If a food product is not sold (step 256), it is determined whether the food product has expired (step 258). One way of determining whether a food product has expired is to determine whether the corresponding elapsed time is less than zero, or some other predetermined threshold. If a food product has not expired, the elapsed time continues to be measured (step 252 ). If a food product has expired, a waste receipt is generated (step 260), and that food product is registered as no longer available for sale (step 262). Similarly, if a food product is sold (step 256), that food product is registered as no longer available for sale (step 262).

As described above, a minimum price of a food product is set based on the time until expiration of the food product. The description below will make reference to the time until expiration. However, since the time until expiration may be used to calculate the age of a food product, and vice versa, those skilled in the art will readily understand how to apply the teachings herein to embodiments where the age is used.

Referring to FIG. 11, a table 280 represents a record of an embodiment of the price adjustment database 96 (FIG. 4), which will typically include a plurality of such records. Each record defines price adjustments for a food product at different ages of that food product. The table 280 includes a record identifier 282 that identifies the food product, typically by the appropriate food product identifier 118 (FIG. 5). The table 280 further includes entries 284 and 286, each defining a price adjustment for different ages of the food product identified by the record identifier 282. The entries 284 and 286 each include (i) an age 288 defining an age or age range: and (ii) a price 290 of the food product having that age. For example, the entry 284 indicates that hamburgers that have been in the warming bins fifteen minutes or less are to be sold at retail price. Any older hamburgers are sold for a customer's change due, as is described in more detail below.

Referring to FIG. 12, a table 300 represents another embodiment of the price adjustment database 96 (FIG. 4). The table 300 defines price adjustments for food products at different ages. The table 300 includes entries 302, 304 and 306, each defining a price adjustment for different ages. Each entry includes (i) an age 308 defining an age or age range; and (ii) a price 310 of any food product having that age. For example, the entry 304 indicates that food products that have been in the warming bins between sixteen minutes and seventeen minutes are to be sold at 50% of retail price.

Retail prices of food products are stored in the inventory database 92 (FIG. 5).

Referring to FIG. 13, a table 320 represents a record of another embodiment of the price adjustment database 96 (FIG. 4), which will typically include a plurality of such records. Each record defines price adjustments for a food product at different ages of that food product. The table 320 includes a record identifier 322 that identifies the food product, typically by the appropriate food product identifier 118 (FIG. 5). The table 320 further includes entries 324, 326 and 328, each defining a price adjustment for different ages of the food product identified by the record identifier 322. Each entry includes (i) an age 330 defining an age or age range; (ii) a minimum price 332 of the food product having that age; and (iii) a maximum price 334 of the food product having that age. In such an embodiment, each entry defines a range of prices for which a food product having a particular age may be sold. For example, the entry 324 indicates that hamburgers that have been in the warming bins fifteen minutes or less are to be sold for the retail price (i.e. between $0.69 and $0.69). Similarly, the entry 328 indicates that hamburgers that have been in the warming bins more than eighteen minutes are to be sold for any amount less than the retail price (i.e. between $0.00 and $0.69).

As will be understood from the above description, the price adjustments for food products may vary with the age of the food product in numerous ways. For example, the price of an food product may decrease proportionally with its age (e.g. $0.05 per minute). Alternatively, there may be a schedule of fixed reductions in the retail price that varies with age (e.g. $0.25 for ages 5–10 minutes, $0.50 for ages 11–20 minutes).

Referring again to FIGS. 11, 12 and 13, the illustrated entries each describe age ranges, which may be referred to as "age categories". For example, the entry 326 defines an age range from sixteen minutes to eighteen minutes old (a first age category), and the entry 326 defines an age range from sixteen minutes to eighteen minutes old (a second age category). The aged inventory database 94 (FIG. 6) stores indications of food products that have aged excessively and thus are desirable to sell at a reduced price, rather than be discarded. The aged inventory database 94 may be considered as storing indications of food products that correspond to one or more predetermined age categories (e.g. all age categories except the first age category).

The POS terminals 12, 14 and 16 (FIG. 1) have access to the aged inventory database 94, which describes food products that have aged excessively and thus are desirable to sell at a reduced price, rather than be discarded. The POS terminals 12, 14 and 16 also have access to the price adjustment database 96, which defines price adjustments for food products at different ages of that food product. Accordingly, the POS terminals 12, 14 and 16 may determine which excessively aged food products are available, as well as prices at which to sell those food products.

Figure 14:
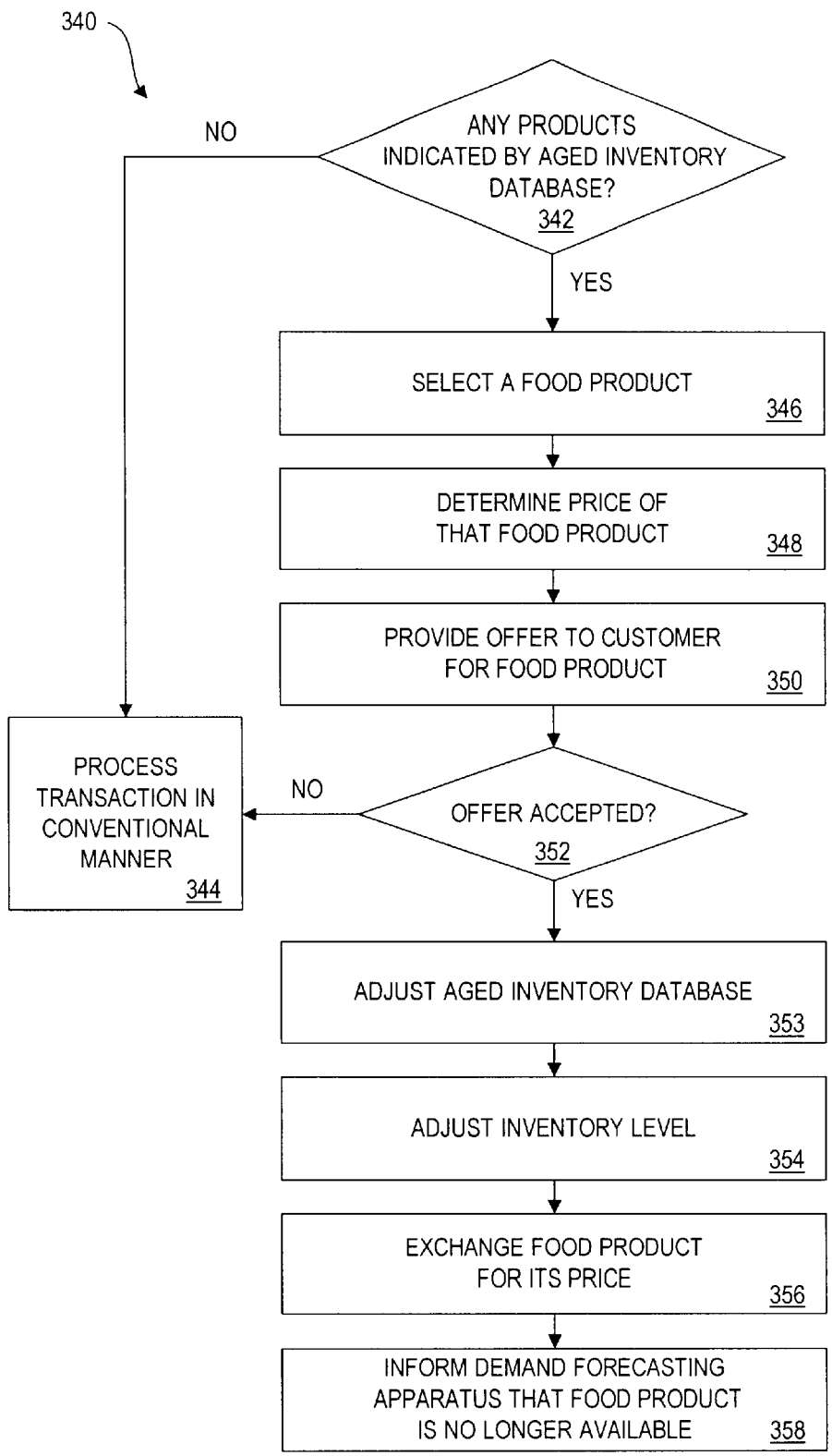
FIG. 14 is a flow chart illustrating another embodiment of a method for selling an aging food product provided in accordance with the present invention.

FIG. 14 describes a method 340 performed by a POS terminal of the restaurant apparatus 10 (FIG. 1) for selling an aging food product. If there are not any food products indicated by the aged inventory database 94 (step 342 ), then the transaction is processed in a conventional manner (step 344). If there are one or more food products indicated by the aged inventory database 94, then a food product is selected (step 346). If more than one food product is indicated, the food product may be, for example, selected at random or selected based on what the customer has ordered.

The price of the selected food product is determined (step 348). As described above, the price adjustment database 96 (FIG. 4) is used to determine the price of the food product based on the age of that food product. In one embodiment, the aged food product has a price that is exactly the minimum price specified by the price adjustment database 96. In another embodiment, the aged food product has a price that is greater than or equal to a minimum price (i.e. a higher price may be charged under certain circumstances). Similarly in still another embodiment, the aged food product has a price that is in a range from a minimum price to a maximum price.

Once the (reduced) price of the selected food product has been determined, an appropriate offer is provided to the customer (step 350). For example, the POS terminal may display a textual message indicating the selected food product and price to the customer and/or cashier. If the customer does not accept the offer (step 352), the cashier so indicates by actuating an appropriate button on the POS terminal, and the transaction is processed in a conventional manner (step 344). If the customer does accept the offer, the aged inventory database is appropriately adjusted (step 353) to reflect the sold food product. For example, the corresponding quantity indicated for a food product is reduced by one if one food product is sold. In one embodiment a separate inventory database, such as a database of food components available for use in the restaurant, is appropriately adjusted as well (step 354).

The selected food product is exchanged for the determined price (step 356), and a signal is sent to the demand forecasting apparatus 168 (FIGS. 7 and 9) indicating that the food product is has been sold and is no longer available (step 358). Thus, the demand forecasting apparatus 168 will not erroneously include sold food products in instructing the preparation of anticipated food products.

The parent application of the present application, patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, describes a method and apparatus in which a customer at a POS terminal is offered an "upsell" in exchange for an amount of change he is due. The POS terminal determines an upsell in dependence on a purchase of the customer, and also determines an upsell price (the amount of change due) based on the purchase. For example, a customer purchasing a first product for $1.74 and tendering $2.00 may be offered a second product in lieu of the $0.26 change due ("round-up amount"). The upsell price, $0.26, thus depends on the purchase price $1.74. Similarly, the $2.00 "rounded price" may also depend on the purchase price $1.74. In this example, the rounded price is the next-greater whole number amount of dollars greater than the purchase price $1.74.

The method and apparatus of the parent application may be advantageously used with the present invention described herein to allow customers to purchase aged inventory for their change due. In particular, since customers generally do not know which food products are aged, it is difficult or impossible for customers to predict which food products will be offered to them. Accordingly, there is a significant randomness in the offers, which prevents customers from successfully taking advantage of the offering process.

Figure 15A:
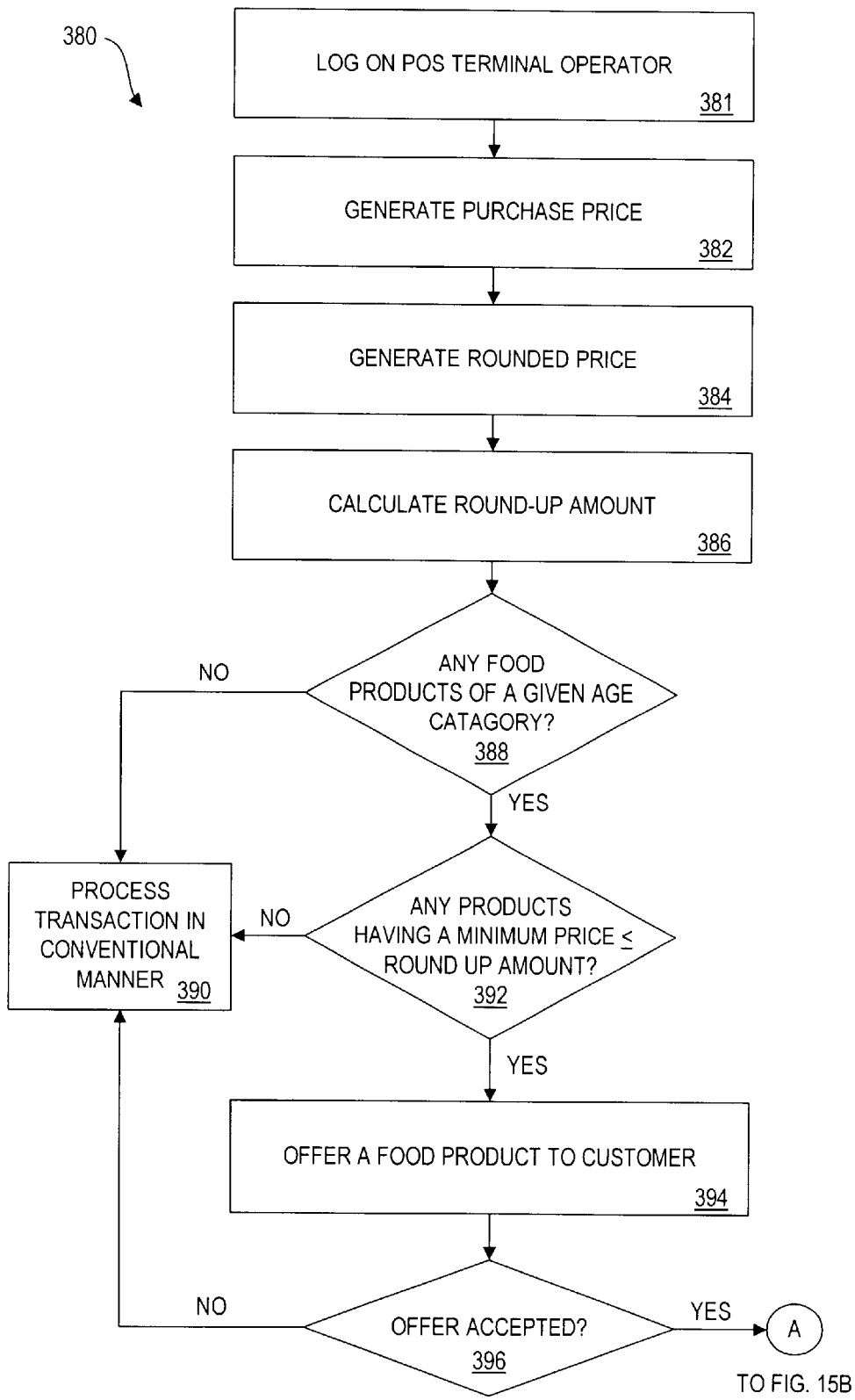
FIGS. 15A and 15B are flow charts illustrating another embodiment of a method for selling an aging food product provided in accordance with the present invention.
Figure 15B:
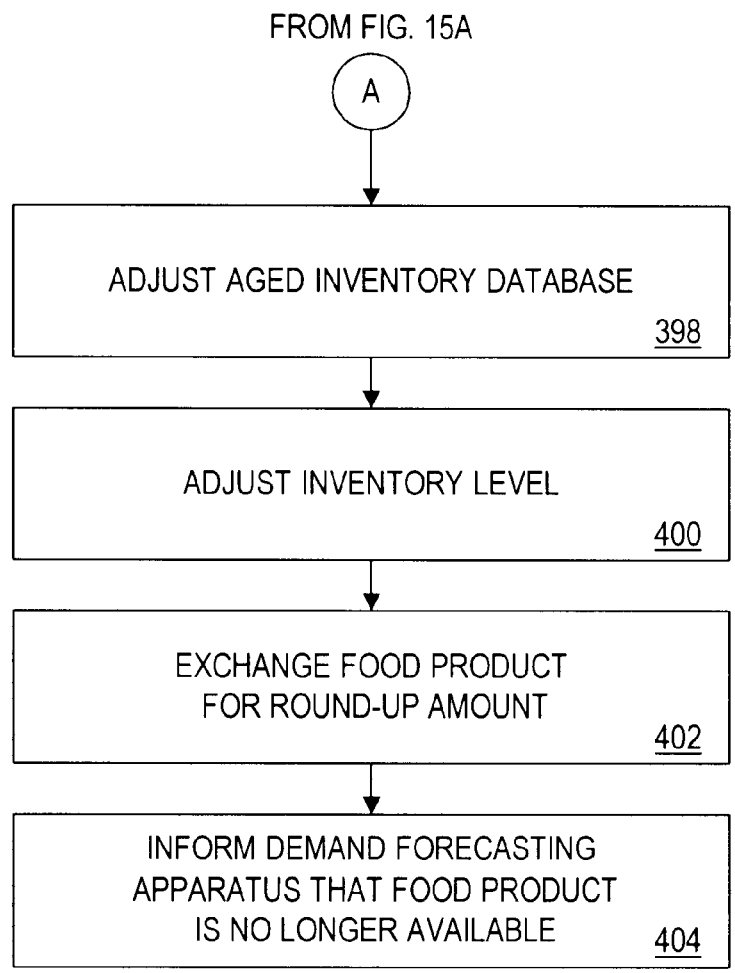

FIGS. 15A and 15B describes a method 380 performed by a POS terminal of the restaurant apparatus 10 (FIG. 1) for selling an aging food product. The POS terminal logs on a POS terminal operator (e.g. a cashier) (step 381), which is typically performed once when an operator begins or resumes operation of the POS terminal (i.e. at the beginning of the operator's shift, or after he has returned from a break). Logging on includes inputting into the POS terminal a unique operator identifier. Thus, subsequent operations performed by or on the POS terminal may be associated with the operator. Benefits to such operating tracking are described below.

During a customer transaction, the POS terminal generates a purchase price and a rounded price (steps 382 and 384). and therefrom calculates a round-up amount (step 386). The round-up amount is the difference between the purchase price and the rounded price. The POS terminal then determines whether there exist any food products that correspond to one or more predetermined age categories (step 388). For example, there may be a first age category that includes food products greater than fifteen minutes old, and a second age category that includes food products less than fifteen minutes old. Food products corresponding to the first age category may be deemed excessively aged, and as such should be exchanged for a customer's change due.

If there are no food products that correspond to the predetermined age categories (i.e. no aged inventory), then the customer transaction is processed in a conventional manner (step 390). Otherwise, the POS terminal determines whether any of these aged food products have a minimum price that is less than or equal to the round-up amount (step 392). If any do, at least one is selected and offered to the customer (step 394). The POS terminal may output an indication of the food product to the operator and/or customer via its display device. For example, the POS terminal may output the text "Would you like a hamburger for your $0.32 change?" Selecting a food product to offer may be based on many criteria. as described below and in the above-cited parent application.

If the offer is accepted by the customer (step 396), the operator may so indicate via a device (e.g. the input device of the POS terminal) that transmits an acceptance signal to the POS terminal. The aged inventory database is appropriately adjusted (step 398) to reflect the sold food product. In one embodiment, a separate inventory database, such as a database of food components available for use in the restaurant, is appropriately adjusted as well (step 400). The selected food product is exchanged for the round-up amount (step 402), so the customer pays the rounded price for the total purchase including the aged food product. Finally, a signal is sent to the demand forecasting apparatus 168 (FIGS. 7 and 9) indicating that the food product is has been sold and is no longer available (step 404).

The above-described step 381 of logging on an operator of the POS terminal allows the acceptance rate of offers to be tracked. For example, a first operator may be very adept at persuading customers to accept an offer for aged food products, while a second operator may not. Accordingly, the acceptance rate of the first operator will be higher than the acceptance rate of the second operator. Tracking the acceptance rate is advantageous if operators receive bonuses or are otherwise compensated based on their average acceptances per offer, number of acceptances per hour, and/or money collected due to accepted offers per hour. Such bonuses may be automatically calculated by a payroll system (e.g. on the store server 18 of FIGS. 1 and 4) that receives acceptance rates from the POS terminals.

Furthermore, operators that are particularly skilled at providing offers to customers may be prompted by the POS terminal to provide more difficult offers, such as persuading customers to "round up" their purchase price to a greater amount (e.g. to the nearest $5 rather than just the nearest $1). Thus, the customer would have a greater round-up amount and would be able to purchase more food products and/or greater value food products.

Logging on each operator may also advantageously grant each operator the ability to access certain POS terminal functions. For example, it may be advantageous to limit the ability to provide offers for aged food products to certain operators. The restaurant management may not want inexperienced operators to engage in anything but the most basic operations at the POS terminal.

As also described above, selecting a food product to offer may be based on many criteria. For example, various types of information about the customer(s) may be input to the POS terminal and used in selecting an upsell that is likely to be accepted. In one embodiment, the operator may indicate (e.g. by pressing one of a plurality of buttons on the POS terminal) the number of people in the customer's "party" (e.g. one customer. two customers, three customers, more than three). Upsells may then be selected based on the number of people. For example, if two people are in the customer's party, then an upsell of two hamburgers may be more appropriate than one or three food products. Other information about the customer(s) which may be used in selecting an upsell include the weight, age and gender of the customer.

In another embodiment of the present invention, aged food products may be sold in packages that include a plurality of food products. Selling packages of items is described in commonly-owned co-pending U.S. patent application Ser. No. 08/923,683 entitled "Conditional Purchase Offer (CPO) Management System for Packages" filed on Sep. 4, 1997 in the name of Jay S. Walker et al.; and U.S. patent application Ser. No. 09/012.163 entitled "Method and Apparatus for Automatically Vending a Combination of Products" filed on Jan. 22, 1998 in the name of Jay S. Walker et al., each incorporated herein by reference. For example, a plurality of aged food products may be offered to a customer for a package price that is lower than the sum of the (reduced) prices of the individual food products. Such a package price is typically based on the individual reduced prices, and thus is based on the times until expiration of the individual food products. Alternatively, a package may include an aged food product and a food product that is not aged. The corresponding package price may be, for example, the retail price of the food product that is not aged. If so, the offer may be "buy product X, get product Y free". Alternatively, the package price may be the customer's change due if the change due is greater than the retail price of the food product that is not aged.

In one embodiment, the POS terminal generates a round-up amount, and a package is constructed based on the round-up amount and the retail prices of food products in the package. In particular, the sum of the retail prices is greater than the round-up amount. The package is offered in exchange for the round-up amount. If accepted, the customer will recognize a significant benefit since the price paid for the package (the round-up amount) is less than the retail prices the customer would have expected to pay. In this embodiment, the package may include one or more aging food products. Of course the package price may be determined in a number of other ways understood by those skilled in the art.

In many of the embodiments described above, reference was made to an offer provided to the customer, the offer being an exchange of an aged food product for a customer's change due. In another embodiment, the minimum price of an aged food product may be output to the customer before his transaction. In particular, it can be advantageous to transmit the minimum price to a price display, such as the DIGITAL MENUBOARD™ by Siren Technologies of Chicago, Ill. The DIGITAL MENUBOARD™ allows promotional messages to be displayed, such as sale prices for food products. Furthermore, the price display would be a convenient way to display product prices that decrease with time. In summary, the customer may see various aged food products advertised at reduced prices before his transaction, and thus aged inventory may be sold upon initiation by the customer.

Some customers may change their mind after having accepted an offer for one or more food products in exchange for change due. If a customer changes his mind before the POS terminal operator has started serving another customer, then the change due amount is still readily available. Accordingly, the operator can easily refund the round-up amount. However, if the customer changes his mind a significant amount of time after the transaction, the round-up amount paid for the food product(s) is typically less readily available to the operator.

If the customer has a receipt for his transaction, the round-up amount is readily determined therefrom, and an appropriate refund may be made. However, many times a receipt will not be printed or will otherwise be unavailable. Accordingly, other methods of determining a round-up amount may be required.

One method for determining the corresponding round-up amount is to re-enter the customer's original food products ordered. The POS terminal may then access a database of daily transactions to determine (i) whether such a transaction was really made; (ii) the round-up amount associated with the transaction, (iii) whether the alleged food product(s) were offered in exchange for the round-up amount; and (iv) whether the offer was accepted. If more than one transaction matches the customer's alleged transaction, the customer may further provide an approximate time of day of the transaction to properly identify his transaction. If appropriate, the POS terminal operator may then refund the appropriate amount to the customer.

Although the present invention has been described with respect to a preferred embodiment thereof, those skilled in the art will note that various substitutions may be made to those embodiments described herein without departing from the spirit and scope of the present invention. For example, although in the embodiments described above reference was made to apparatus that keep food products warm while they await being sold, the present invention may likewise employ apparatus that keep food products (e.g. ice cream) cold while they await being sold.

What is claimed is:

1. A method for selling an aging food product, comprising:
   determining a time until expiration of a food product;
   setting a minimum price of the food product based on the time until expiration;
   generating a purchase price of a purchase;
   generating a rounded price;
   calculating a round-up amount, the round-up amount being a difference between the purchase price and the rounded price; and
   providing an offer to exchange the food product for the round-up amount if the minimum price is not greater than the round-up amount.

2. The method of claim 1, in which the step of setting a minimum price of the food product comprises:
   identifying a record that corresponds to the time until expiration; and
   determining the minimum price from the record.

3. The method of claim 1, in which the step of setting a minimum price of the food product comprises:
   identifying a record that corresponds to the time until expiration;
   determining a discount from the record; and
   applying the discount to a retail price to determine the minimum price.

4. The method of claim 1, in which the step of setting a minimum price of the food product comprises:
   setting the minimum price to zero if the time until expiration is greater than a predetermined threshold.

5. The method of claim 1, in which the step of setting a minimum price of the food product comprises:
   setting a price range of the food product the price range defined by the minimum price and a maximum price.

6. The method of claim 1, further comprising:
   generating a waste receipt if the time until expiration is less than a predetermined threshold.

7. The method of claim 1, in which the step of determining a time until expiration of a food product comprises:
   receiving a start signal indicating that a food product is available to sell; and
   measuring an elapsed time since the start signal was received.

8. The method of claim 1, further comprising:
   receiving an acceptance of the offer.

9. The method of claim 8, further comprising:
   sending a signal to a demand forecasting system if the offer is accepted, the signal indicating that the food product has been sold.

10. The method of claim 1, further comprising:
    outputting an indication of the minimum price.

11. The method of claim 10, in which the step of outputting an indication of the minimum price comprises:
    transmitting the minimum price to a price display.

12. The method of claim 1, in which the step of determining a time until expiration of a food product comprises:
    determining a time until expiration of each of a plurality of food products, the plurality of food products composing a food package; and in which the step of setting a minimum price of the food product comprises:
    setting a minimum price of the food package based on the times until expiration of the food products.

13. The method of claim 12, further comprising:
    setting a minimum price of each food product based on the times until expiration of the food products.

14. The method of claim 12, in which the step of setting a minimum price of the food package comprises:
    setting a minimum price of each food product based on age categories of the food products.

15. A method for selling an aging food product, comprising:
    measuring the age of a food product;
    setting a minimum price of the food product based on the age;
    generating a purchase price of a purchase;
    generating a rounded price;
    calculating a round-up amount, the round-up amount being a difference between the purchase price and the rounded price; and providing an offer to exchange the food product for the round-up amount if the minimum price is not greater than the round-up amount.

16. The method of claim 15, in which the step of setting a minimum price comprises:

setting a minimum price of the food product if the age is within a predetermined age range.

17. A method for facilitating selling an aging food product, comprising:

receiving a start signal indicating that a food product is available to sell;

measuring an elapsed time since the start signal was received; and registering the food product as available to be sold for change due if the elapsed time is greater than a predetermined threshold.

18. A method for warming a food product, comprising:

receiving a start signal indicating that a food product has been placed in a warming apparatus;

measuring an elapsed time since the start signal was received; and registering the product as available to be sold for change due if the elapsed time is greater than a predetermined threshold.

19. A method for selling an aging food product, comprising:

receiving a first start signal indicating that a food component has been placed in a food component warmer;

measuring a first elapsed time since the first start signal was received;

using the food component to assemble a food product before the first elapsed time exceeds a predetermined threshold;

measuring the age of the food product;

setting a minimum price of the food product based on the age of the food product;

generating a purchase price of a purchase;

generating a rounded price;

calculating a round-up amount, the round-up amount being a difference between the purchase price and the rounded price; and providing an offer to exchange the food product for the round-up amount if the minimum price is not greater than the round-up amount.

20. The method of claim 19, further comprising:

receiving a signal that indicates that the food component has been used to assemble a food product.

21. The method of claim 19, in which the step of measuring the age of the food product comprises:

receiving a second start signal indicating that a food product is available to sell; and measuring a second elapsed time since the second start signal was received.

22. A method for selling an aging food product, comprising:

initiating a timer to generate an age of a food product;

determining an age category based on the age;

storing an indication of a food product that corresponds to a predetermined age category;

generating a purchase price of a purchase;

generating a rounded price;

calculating a round-up amount, the round-up amount being a difference between the purchase price and the rounded price; and outputting an offer to exchange the food product for the round-up amount.

23. A method for selling an aging food product, comprising:

determining whether a food product that corresponds to a predetermined age category exists;

outputting an indication of the food product;

generating a purchase price of a purchase;

generating a rounded price;

calculating a round-up amount, the round-up amount being a difference between the purchase price and the rounded price; and determining whether a food product that corresponds to a predetermined age category and that has a minimum price not greater than the round-up amount exits, and if so, outputting an offer to exchange the food product for the round-up amount.

24. A method for facilitating selling an aging food product, comprising:

measuring the age of a food product;

setting a minimum price of the food product based on the age;

generating a purchase price of a purchase;

generating a rounded price;

calculating a round-up amount, the round-up amount being a difference between the purchase price and the rounded price; and outputting an indication of the food product if the minimum price is not greater than the round-up amount.

25. The method of claim 24, further comprises;

receiving an acceptance signal that indicates an acceptance of an offer for the food product in exchange for the round-up amount.

26. The method of claim 24, further comprises:

adjusting an inventory level of the food product based on the received acceptance signal.

27. A method for selling an aging food product, comprising:

determining if a food product in a warming bin can be used to satisfy an order; and providing an offer to sell the food product for at least one of change due and a round-up amount if the food product cannot be used to satisfy an order.

28. An apparatus for selling an aging food product, comprising:

means for holding a food product;

a timer for determining a time until expiration of the food product held in the means for holding;

a database for storing a minimum price of the food product;

means for setting the minimum price based on the time until expiration; and means for providing an offer to sell the food product for change due if the minimum price is not greater than the change due.

29. The apparatus of claim 28, in which the means for holding a food product comprises:

a warming bin.

30. The apparatus of claim 28, further comprising:

a food component warmer for holding a food component used to assemble the food product.

31. The apparatus of claim 28, further comprising:

means for receiving a signal indicating that the food product has been assembled.

32. The apparatus of claim 28, further comprising:
means for receiving a signal indicating that the food product has been sold.

33. A method for facilitating selling an aging food product, comprising:
receiving a round-up amount from a POS terminal;
determining an aging food product having a minimum price that is not greater than the round-up amount; and
transmitting an indication of the food product to the POS terminal.

34. An apparatus for selling an aging food product, comprising:
a point-of-sale terminal, including
a processor, and
a memory connected to the processor and containing instructions for controlling the processor; and
an automated kitchen apparatus in communication with the point-of-sale terminal and operative to maintain aging food products held therein in a saleable condition for a predetermined period of time, the automated kitchen apparatus including means for measuring the time aged food products are held therein;
the point-of-sale terminal operative with the instructions in the memory to:
receive, from the automated kitchen apparatus, data relating to at least one aged food product contained in the automated kitchen apparatus,
determine a price for the at least one aged food product, the price being a function of the time the aged food product is contained in the automated kitchen apparatus,
output the price for the at least one aged food product, and
generate an offer to exchange the at least one aged food product for change due if the price is not greater than the change due.

35. The apparatus of claim 34, in which the price is further a function of a predetermined saleable time period during which the at least one aged food product may be sold after being placed in the automated kitchen apparatus.

36. The apparatus of claim 34, in which the processor is further operative to receive food product transaction data for a food product transaction, and in which the price is further a function of the food product transaction data.

37. The apparatus of claim 36, in which the food product transaction data includes an amount tendered for the purchase of the at least one aged food product.

38. The apparatus of claim 36, in which the food product transaction data includes data identifying a plurality of food products.

39. An apparatus for selling an aging food product, comprising:
a storage device; and
a processor connected to the storage device,
the storage device for storing a program for controlling the processor; and
the processor operative with the program to:
determine a time until expiration of a food product;
set a minimum price of the food product based on the time until expiration;
generate a purchase price of a purchase;
generate a rounded price;
calculate a round-up amount, the round-up amount being a difference between the purchase price and the rounded price; and
provide an offer to exchange the food product for the round-up amount if the minimum price is not greater than the round-up amount.

40. An apparatus for selling an aging food product, comprising:
a storage device; and
a processor connected to the storage device,
the storage device for storing a program for controlling the processor; and
the processor operative with the program to:
measure the age of a food product;
set a minimum price of the food product based on the age;
generate a purchase price of a purchase;
generate a rounded price;
calculate a round-up amount, the round-up amount being a difference between the purchase price and the rounded price; and
provide an offer to exchange the food product for the round-up amount if the minimum price is not greater than the round-up amount.

41. An apparatus for facilitating selling an aging food product, comprising:
a storage device; and
a processor connected to the storage device,
the storage device for storing a program for controlling the processor; and
the processor operative with the program to:
receive a start signal indicating that a food product is available to sell;
measure an elapsed time since the start signal was received; and
register the food product as available to be sold for change due if the elapsed time is greater than a predetermined threshold.

42. An apparatus for warming a food product, comprising:
a storage device; and
a processor connected to the storage device,
the storage device for storing a program for controlling the processor; and
the processor operative with the program to:
receive a start signal indicating that a food product has been placed in a warming apparatus;
measure an elapsed time since the start signal was received; and
register the product as available to be sold for change due if the elapsed time is greater than a predetermined threshold.

43. An apparatus for selling an aging food product, comprising:
a storage device; and
a processor connected to the storage device,
the storage device for storing a program for controlling the processor; and
the processor operative with the program to:
receive a first start signal indicating that a food component has been placed in a food component warmer;
measure a first elapsed time since the first start signal was received;
determine whether the first elapsed time exceeds a predetermined threshold;
measure the age of the food product;
set a minimum price of the food product based on the age of the food product;

generate a purchase price of a purchase;
generate a rounded price;
calculate a round-up amount, the round-up amount being a difference between the purchase price and the rounded price; and
provide an offer to exchange the food product for the round-up amount if the minimum price is not greater than the round-up amount.

44. An apparatus for selling an aging food product, comprising:
a storage device; and
a processor connected to the storage device,
the storage device for storing a program for controlling the processor; and
the processor operative with the program to:
initiate a timer to generate an age of a food product;
determine an age category based on the age;
store an indication of a food product that corresponds to a predetermined age category;
generate a purchase price of a purchase;
generate a rounded price;
calculate a round-up amount, the round-up amount being a difference between the purchase price and the rounded price; and
output an offer to exchange the food product for the round-up amount.

45. An apparatus for selling an aging food product, comprising:
a storage device; and
a processor connected to the storage device,
the storage device for storing a program for controlling the processor; and
the processor operative with the program to:
determine whether a food product that corresponds to a predetermined age category exists; and
output an indication of the food product;
generate a purchase price of a purchase;
generate a rounded price;
calculate a round-up amount, the round-up amount being a difference between the purchase price and the rounded price; and
output an offer to exchange the food product for the round-up amount.

46. An apparatus for facilitating selling an aging food product, comprising:
a storage device; and
a processor connected to the storage device,
the storage device for storing a program for controlling the processor; and
the processor operative with the program to:
measure the age of a food product;
set a minimum price of the food product based on the age;
generate a purchase price of a purchase;
generate a rounded price;
calculate a round-up amount, the round-up amount being a difference between the purchase price and the rounded price; and
output an indication of the food product if the minimum price is not greater than the round-up amount.

47. An apparatus for selling an aging food product, comprising:
a storage device; and
a processor connected to the storage device,
the storage device for storing a program for controlling the processor; and
the processor operative with the program to:
determine if a food product in a warming bin can be used to satisfy an order; and
provide an offer to sell the food product for at least one of change due and a round-up amount if the food product cannot be used to satisfy an order.

48. A computer readable medium encoded with processing instructions to direct a device to perform a method for selling an aging food product, the method comprising the steps of:
determining a time until expiration of a food product;
setting a minimum price of the food product based on the time until expiration;
generating a purchase price of a purchase;
generating a rounded price;
calculating a round-up amount, the round-up amount being a difference between the purchase price and the rounded price; and
providing an offer to exchange the food product for the round-up amount if the minimum price is not greater than the round-up amount.

49. A computer readable medium encoded with processing instructions to direct a device to perform a method for selling an aging food product, the method comprising the steps of:
measuring the age of a food product;
setting a minimum price of the food product based on the age;
generating a purchase price of a purchase;
generating a rounded price;
calculating a round-up amount, the round-tip amount being a difference between the purchase price and the rounded price; and
providing an offer to exchange the food product for the round-up amount if the minimum price is not greater than the round-up amount.

50. A computer readable medium encoded with processing instructions to direct a device to perform a method for facilitating selling an aging food product, the method comprising the steps of:
receiving a start signal indicating that a food product is available to sell;
measuring an elapsed time since the start signal was received; and
registering the food product as available to be sold for change due if the elapsed time is greater than a predetermined threshold.

51. A computer readable medium encoded with processing instructions to direct a device to perform method for warming a food product, the method comprising the steps of:
receiving a start signal indicating that a food product has been placed in a warming apparatus;
measuring an elapsed time since the start signal was received; and
registering the product as available to be sold for change due if the elapsed time is greater than a predetermined threshold.

52. A computer readable medium encoded with processing instructions to direct a device to perform a method for selling an aging food product, the method comprising the steps of:
receiving a first start signal indicating that a food component has been placed in a food component warmer;
measuring a first elapsed time since the first start signal was received;

using the food component to assemble a food product before the first elapsed time exceeds a predetermined threshold;

measuring the age of the food product;

setting a minimum price of the food product based on the age of the food product;

generating a purchase price of a purchase;

generating a rounded price;

calculating a round-up amount, the round-up amount being a difference between the purchase price and the rounded price; and providing an offer to exchange the food product for the round-up amount if the minimum price is not greater than the round-up amount.

53. A computer readable medium encoded with processing instructions to direct a device to perform a method for selling an aging food product, the method comprising the steps of:

initiating a timer to generate an age of a food product;

determining an age category based on the age;

storing an indication of a food product that corresponds to a predetermined age category;

generating a purchase price of a purchase;

generating a rounded price;

calculating a round-up amount, the round-up amount being a difference between the purchase price and the rounded price; and outputting an offer to exchange the food product for the round-up amount.

54. A computer readable medium encoded with processing instructions to direct a device to perform a method for selling an aging food product, the method comprising the steps of:

determining whether a food product that corresponds to a predetermined age category exists;

outputting an indication of the food product;

generating a purchase price of a purchase;

generating a rounded price;

calculating a round-up amount, the round-up amount being a difference between the purchase price and the rounded price; and outputting an offer to exchange the food product for the round-up amount.

55. A computer readable medium encoded with processing instructions to direct a device to perform a method for facilitating selling an aging food product, the method comprising the steps of:

measuring the age of a food product;

setting a minimum price of the food product based on the age;

generating a purchase price of a purchase;

generating a rounded price;

calculating a round-up amount, the round-up amount being a difference between the purchase price and the rounded price; and outputting an indication of the food product if the minimum price is not greater than the round-up amount.

56. A computer readable medium encoded with processing instructions to direct a device to perform a method for selling an aging food product, the method comprising the steps of:

determining if a food product in a warming bin can be used to satisfy an order; and providing an offer to sell the food product for at least one of change due and a round-up amount if the food product cannot be used to satisfy an order.

* * * * *